United States Patent
Key

(10) Patent No.: US 11,557,232 B2
(45) Date of Patent: *Jan. 17, 2023

(54) INTERACTIVE ROTATING LABEL AND CLOSURE COORDINATION SYSTEM

(71) Applicant: SpinLabel Technologies, Inc., Miami, FL (US)

(72) Inventor: Stephen M. Key, Glenbrook, NV (US)

(73) Assignee: SpinLabel Technologies, Inc., Boca Raton, FL (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/565,394

(22) Filed: Sep. 9, 2019

(65) Prior Publication Data

US 2020/0005687 A1    Jan. 2, 2020

Related U.S. Application Data

(63) Continuation of application No. 13/469,026, filed on May 10, 2012, now Pat. No. 10,410,556.

(60) Provisional application No. 61/521,697, filed on Aug. 9, 2011.

(51) Int. Cl.
  *G09F 3/10*   (2006.01)
  *G09F 23/06*  (2006.01)
  *G09F 3/02*   (2006.01)
  *G09F 3/04*   (2006.01)
  *G06Q 30/02*  (2012.01)

(52) U.S. Cl.
  CPC ............ *G09F 23/06* (2013.01); *G09F 3/0288* (2013.01); *G09F 3/04* (2013.01); *G09F 3/10* (2013.01); *G06Q 30/0208* (2013.01); *G06Q 30/0209* (2013.01); *G09F 2003/0251* (2013.01); *G09F 2003/0272* (2013.01); *G09F 2003/0273* (2013.01)

(58) Field of Classification Search
  CPC ......... A61J 1/00; B65D 79/02; B65D 51/245; B65D 47/03; G06G 1/001; G09F 3/10; G09F 23/00; A63F 3/06; A63F 3/0605; A63F 3/0615; A63F 3/065
  USPC ................................................. 283/901, 903
  See application file for complete search history.

(56) References Cited

U.S. PATENT DOCUMENTS

| | | | | |
|---|---|---|---|---|
| 2,860,431 A | * | 11/1958 | Barnum, Jr. ......... | B65D 17/464 40/306 |
| 3,233,770 A | * | 2/1966 | Waters .................... | B65D 53/04 215/230 |
| 3,365,819 A | * | 1/1968 | Connell .................... | G09B 3/02 434/348 |
| 3,633,781 A | * | 1/1972 | Zapata .................... | B65D 41/12 215/328 |
| 4,203,240 A | * | 5/1980 | Goodwin ................ | A63F 3/065 283/56 |

(Continued)

FOREIGN PATENT DOCUMENTS

SI            21288 A  *  2/2004

*Primary Examiner* — Cassandra Davis
(74) *Attorney, Agent, or Firm* — Thomas Stanton

(57) ABSTRACT

The present application is directed to systems and methods for an interactive label and closure for a container. Information may be printed on an interior portion of the closure and a base label. A portion of the base label may be visible through a transparent window in a top label having. Rotation of the top label may cause the transparent window to display label information of varying relevance to the closure information.

3 Claims, 27 Drawing Sheets

(56) References Cited

U.S. PATENT DOCUMENTS

| | | | |
|---|---|---|---|
| 6,212,803 B1* | 4/2001 | Key | B65C 3/065 |
| | | | 215/252 |
| 6,267,672 B1* | 7/2001 | Vance | G06Q 30/02 |
| | | | 463/29 |
| 6,276,533 B1* | 8/2001 | Kaplan | B65D 51/245 |
| | | | 206/534 |
| 6,649,007 B1* | 11/2003 | Key | G09F 3/02 |
| | | | 156/215 |
| 8,500,022 B2* | 8/2013 | Kidwell | B65D 5/38 |
| | | | 235/462.01 |
| 2003/0036039 A1* | 2/2003 | Parker | A47G 19/025 |
| | | | 434/156 |
| 2004/0108237 A1* | 6/2004 | McClintock | G09F 3/0288 |
| | | | 206/459.1 |
| 2005/0209870 A1* | 9/2005 | Alden | G06Q 30/02 |
| | | | 705/1.1 |
| 2009/0301921 A1* | 12/2009 | Kidwell | B65D 5/38 |
| | | | 206/459.5 |
| 2009/0315315 A1* | 12/2009 | Bolouri | G09F 23/00 |
| | | | 283/56 |
| 2012/0292219 A1* | 11/2012 | Terwilliger | G09F 3/10 |
| | | | 206/459.5 |

* cited by examiner

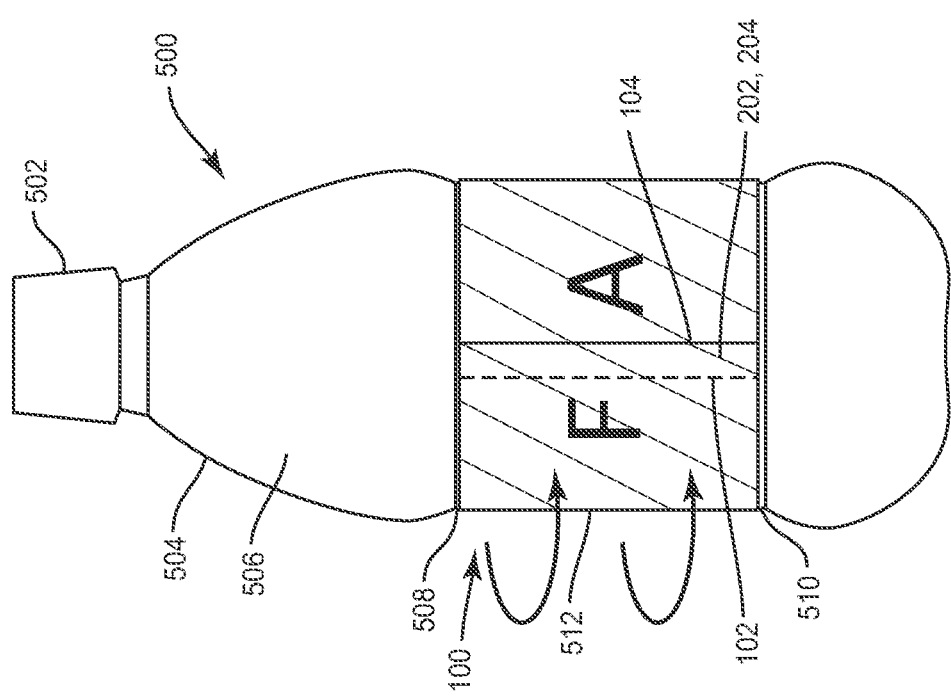

INTERACTIVE ROTATING LABEL AND CLOSURE COORDINATION SYSTEM

CROSS-REFERENCE TO RELATED APPLICATIONS

The present application is a continuation of U.S. patent application Ser. No. 13/469,026, filed May 10, 2012, titled, "Interactive Rotating Label and Closure Coordination System" (pending), and claims priority to provisional U.S. Patent Application Ser. No. 61/521,697 filed on Aug. 9, 2011, titled "Interactive Rotating Label and Bottle Cap Coordination System", each of which is hereby incorporated by reference herein in its entirety.

FIELD OF THE INVENTION

The present application is directed generally to labels, and more specifically to an interactive and coordinated label and closure system for consumer product containers.

BACKGROUND

A common practice in the beverage industry is to print information under the closure (such as a cap) of a beverage container as part of a contest, promotion, or other type of game. However, a consumer of the beverage is typically given only one chance to win the contest or promotion because there is typically only a single code or symbol printed within the closure. Once the consumer removes the closure and reveals the code, no further interaction may occur between the consumer and the product, or with the manufacturer of the product.

The limited space on a label of the beverage container also poses challenges for the manufacturer to convey details of the game or promotion to the consumer. Once mandatory information such as product name, logos, bar codes, ingredients, nutritional information, and the like are placed on the label, little space is left to convey game or contest information to the consumer. Thus, manufacturers often resort to printing an additional piece of literature that must be placed in proximity to the beverage in stores.

SUMMARY

The present application is directed to systems and methods for an interactive and coordinated label and closure for a container. An exemplary interactive and coordinated label and closure system may comprise a removable closure on the container, and the closure may comprise information printed on an interior portion of the closure. A base label having a front surface with printed label information may be adhered to the container. The interactive and coordinated label and closure system may further comprise an opaque rotating top label covering at least a portion of the base label. A transparent window may be located within the opaque rotating top label such that at least a portion of the printed label information is visible through the transparent window. Rotation of the top label may cause the transparent window to display label information of varying relevance to the closure information.

According to additional exemplary embodiments, the present application may be directed to interactive and coordinated methods for finding information of increasing relevance between a label and a closure on a container. An exemplary method may comprise providing a container with a removable closure, and locating printed closure information on an interior portion of the closure. A rotating top label may be provided having a transparent window to display at least a first portion of label information of varying relevance to the closure information when the top label is rotated. The method may further comprise a URL for a website on the top label or a base label.

BRIEF DESCRIPTION OF THE DRAWINGS

FIG. 5B illustrates an exemplary label secured about a container according to various embodiments.

DETAILED DESCRIPTION

The present application is directed to systems and methods for an interactive and coordinated label and closure for a container. An exemplary interactive and coordinated label and closure system may comprise a removable closure on the container, and the closure may comprise information printed on an interior portion of the closure. A base label having a front surface with printed label information may be adhered to the container. The interactive and coordinated label and closure system may further comprise an opaque rotating top label covering at least a portion of the base label. A transparent window may be located within the opaque rotating top label such that at least a portion of the printed label information is visible through the transparent window. Rotation of the top label may cause the transparent window to display label information of varying relevance to the closure information.

Figure 1:
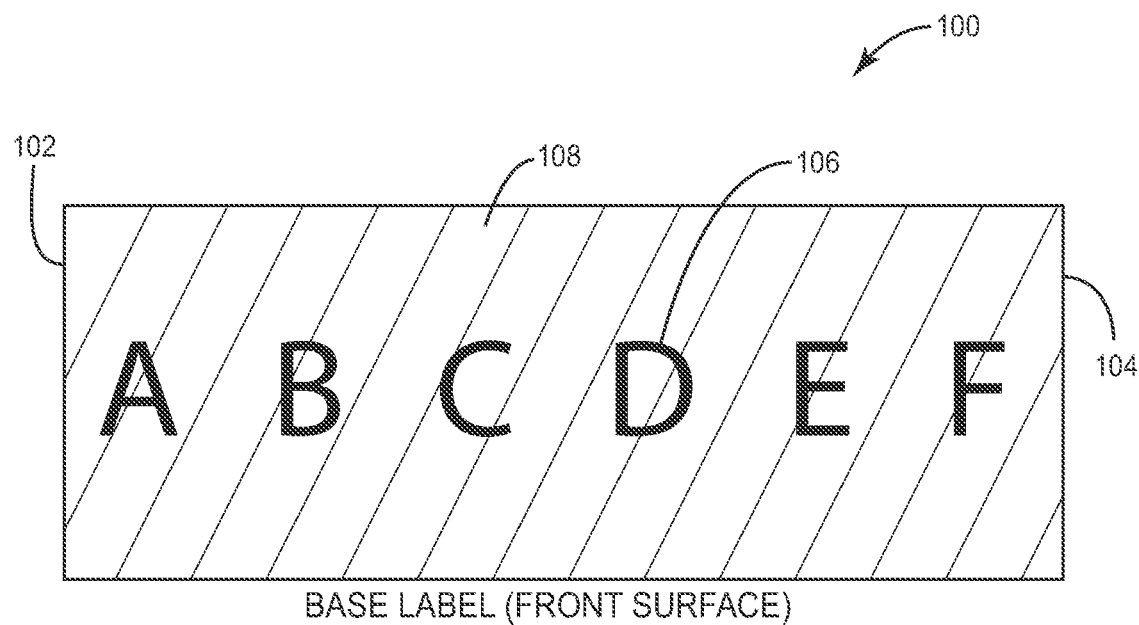
FIG. 1 is a front view of an exemplary label according to various embodiments.

FIG. 1 illustrates various embodiments of a front surface 108 of a base label 100 for an object, such as a medication container, according to various embodiments. The base label 100 comprises a leading edge 102 and a trailing edge 104. While the leading edge 102 is oriented to the left and the trailing edge is oriented to the right as presented in FIG. 1, the orientation of the leading edge 102 and the trailing edge 104 could be reversed depending on which edge is first applied to the object. Both orientations are within the scope of the present disclosure. Base label front surface 108 may comprise writing, indicia, or other printed label information 106 thereon.

As used herein, the leading edge refers to the first edge to be affixed to the object and the trailing edge refers to the second edge to be affixed to the object or the overlapping leading edge. Depending on the orientation of the label and the object when the label is affixed to the object, either edge of the label may be the leading edge. The orientations presented in the figures are for convenience and are not intended to be limiting in any way.

Figure 2:
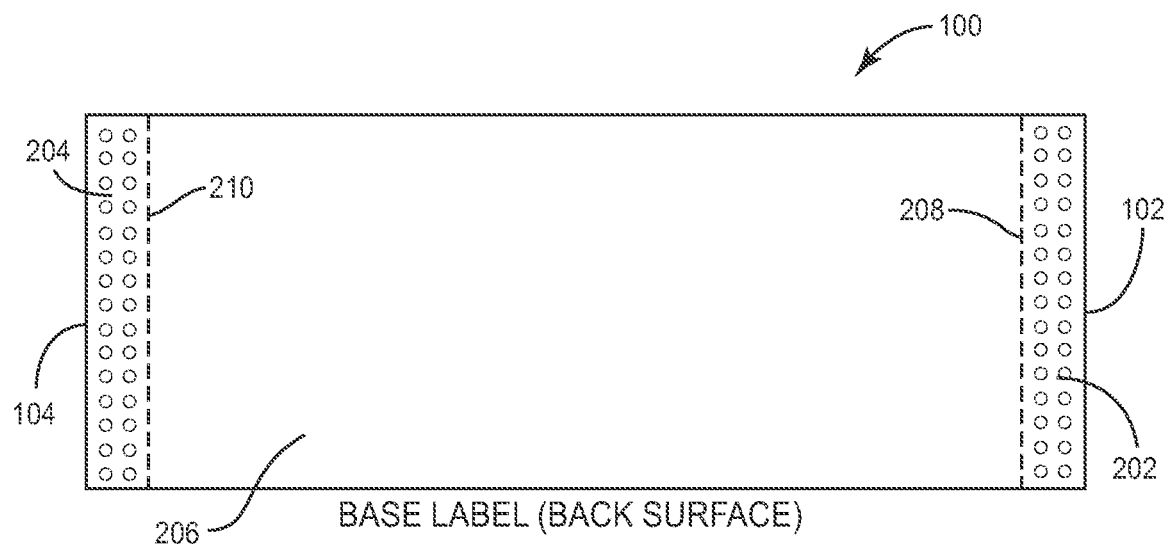
FIG. 2 is a back view of an exemplary label according to various embodiments.

FIG. 2 illustrates various embodiments of a back surface 206 of the base label 100. In various embodiments, the base label back surface 206 comprises two strips of adhesive 202 and 204 on or immediately adjacent to the leading and trailing edges, 102 and 104, respectively. Base label leading edge adhesive 202 may have a boundary 208 defined as its limit on the base label back surface 206. Base label trailing edge adhesive 204 may also have a boundary 210. While FIG. 2 illustrates that the adhesive strips 202 and 204 are generally close to the base label leading and trailing edges 102 and 104, respectively, it is understood that the adhesive strips 202 and 204 may be continuous or discontinuous, and may extend across any portion of the base label back surface 206, including the entire base label back surface 206. In various embodiments, a length of the base label 100 may be selected to be slightly longer than a circumference of the object on which it is placed, such that the trailing edge 104 overlaps the leading edge 102, and the trailing edge 104 is affixed to the leading edge 102. In various embodiments, the length of the base label 100 may be selected to be approximately the same as the circumference of the object on which it is placed, such that the leading edge 102 and the trailing edge 104 do not overlap.

Figure 3:
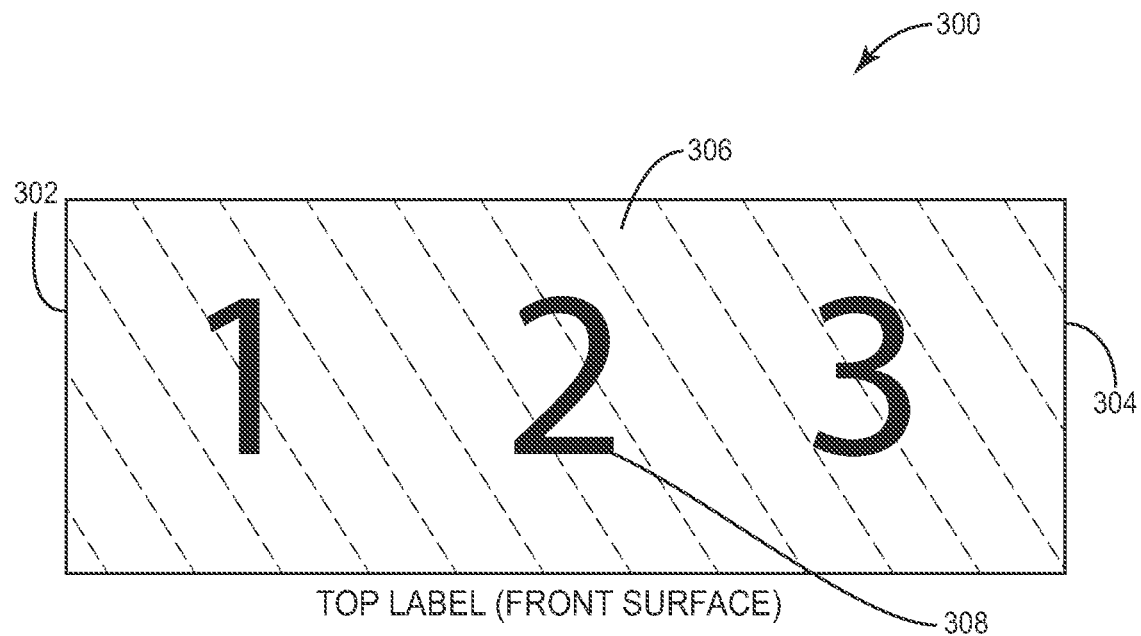
FIG. 3 is a front view of an exemplary label according to various embodiments.

FIG. 3 illustrates various embodiments of a front surface 306 of a top label 300. Top label 300 comprises a leading edge 302 and a trailing edge 304, and indicia 308 may be imprinted on the top label front surface 306.

Figure 4:
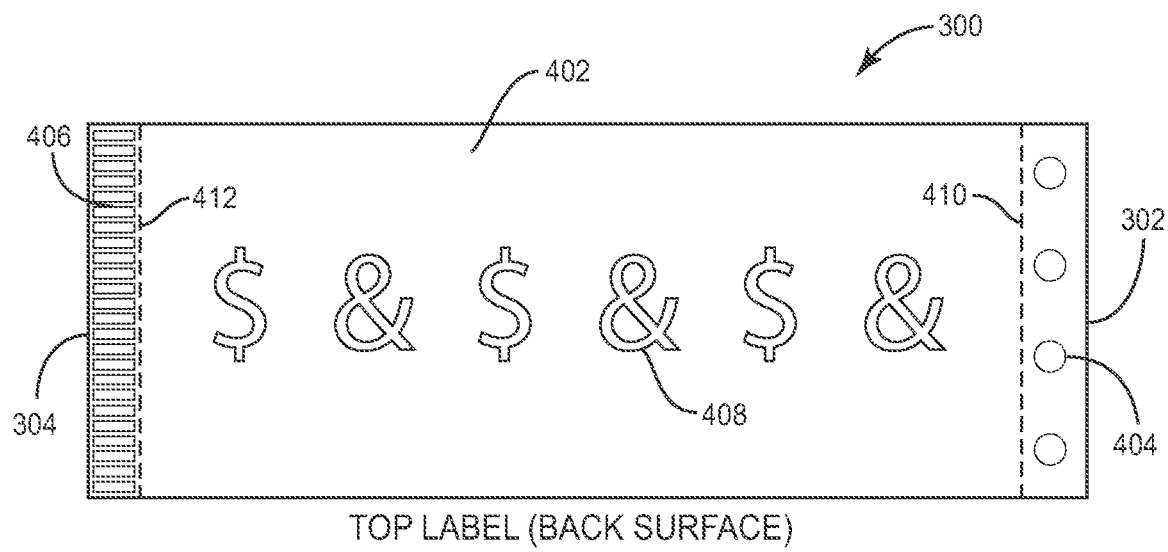
FIG. 4 is a back view of an exemplary label according to various embodiments.

Various embodiments of a back surface 402 of the top label 300 are illustrated in FIG. 4. The top label back surface 402 may comprise various indicia 408 printed thereon, as well as two strips of adhesive 404 and 406 on or immediately adjacent to the leading and trailing edges, 302 and 304, respectively. Top label leading edge adhesive 404 may have a boundary 410 defined as its limit on the top label back surface 402. Top label trailing edge adhesive 406 may also have a boundary 412. While FIG. 4 illustrates that the adhesive strips 404 and 406 are generally close to the top label leading and trailing edges 302 and 304, respectively, it is understood that the adhesive strips 404 and 406 may be continuous or discontinuous, and may extend across any portion of the top label back surface 402, including the entire top label back surface 402. In various embodiments, the adhesive strips 404 and 406 are confined to areas near the leading and trailing edges 302 and 304, respectively, so as not to obscure or interfere with the top label back surface indicia 408.

The base label adhesive 202, 204 and the top label adhesive 404, 406 may be applied in a variety of patterns as can be appreciated by one skilled in the art. The adhesive 202, 204, 404, 406 may be applied in in strips, dots, droplets, circles, rectangles, squares, triangles, lines, and the like, as well as combinations of patterns.

A length of the top label 300 may be selected to be slightly longer than a circumference of the object on which it is placed, such that the top label trailing edge 304 overlaps the top label leading edge 302, and the top label trailing edge 304 is affixed to the top label leading edge 302. In various embodiments, the length of the top label 300 may be selected to be approximately the same as the circumference of the object on which it is placed, such that both the leading edge 302 and the trailing edge 304 do not overlap and are affixed to the base label front surface 108.

Figure 5A:
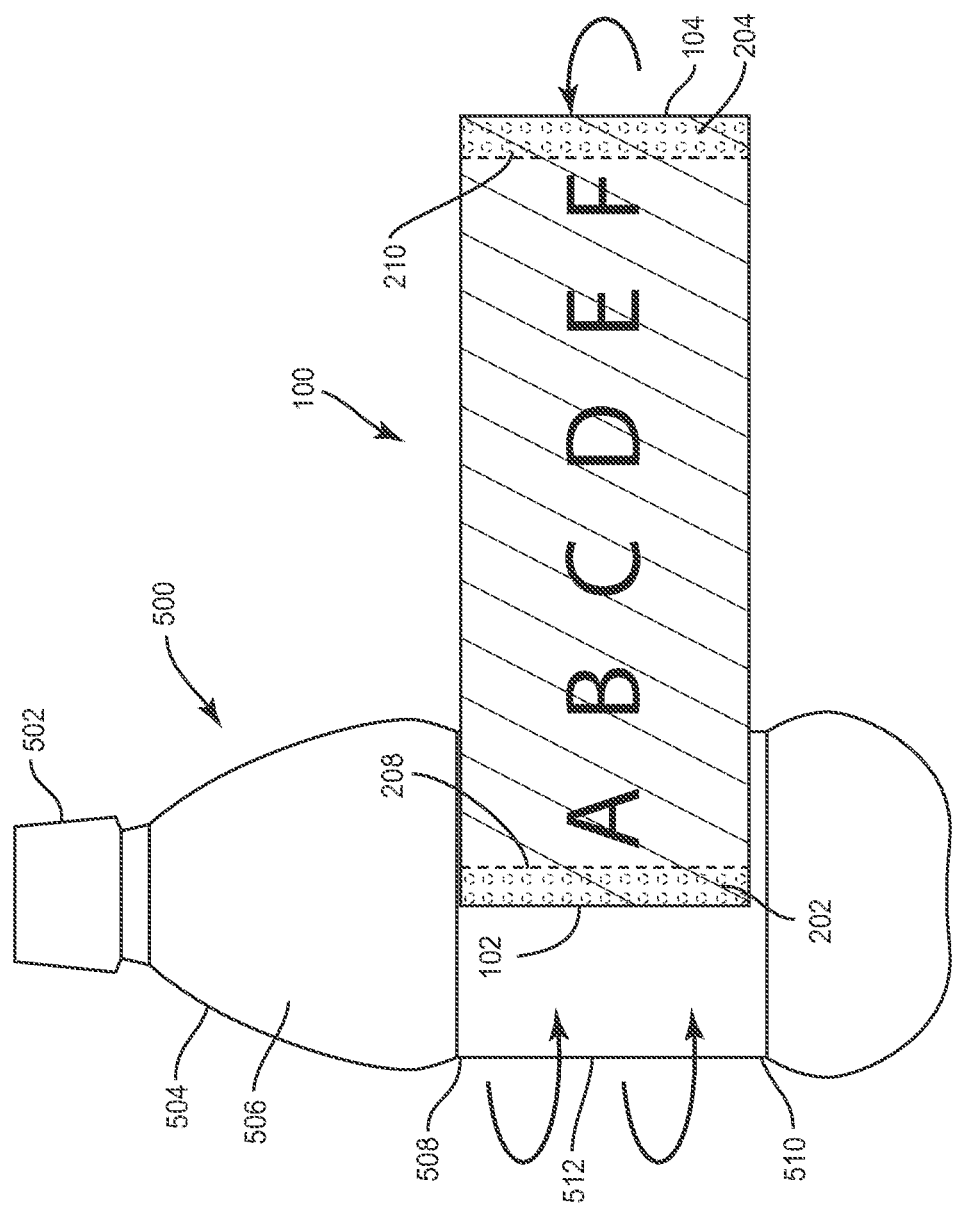
FIG. 5A illustrates a leading edge of an exemplary label affixed to a container according to various embodiments.

FIG. 5A illustrates the application of the base label 100 to an exemplary container 500 according to various embodiments. The container 500 may be a glass or plastic bottle, or other type of container such as a metal can or a cardboard receptacle. The container may be round, rectangular, square, or any other shape known in the art. The term "container" is used here for convenience to describe exemplary embodiments. It is understood that the container may be any object, including non-containers. Container 500 may comprise a closure 502 removably secured to a body 504. Various embodiments of the body 504 may have an exterior surface 506 that comprises a upper label panel 508, a lower label panel 510, and a recessed area 512 interposed between the upper label panel 508 and the lower label panel 510. As discussed below, the base label 100 may be applied to the container 500 at the recessed area 512 between the upper label panel 508 and the lower label panel 510.

In various embodiments, the closure 502 may function to seal an opening in the container 500, such as the opening of a beverage container 500. The closure 502 may be of any type known in the art to seal the container 500 to help preserve the product in the container 500 and to prevent spills. The closure may be constructed of any material suitable for the purpose, such as plastic, metal, or glass. For example, in certain embodiments, the container 500 may be a plastic container 500 for a beverage. The closure 502 may comprise a removable and resealable screw-on plastic cap 502. Closures 502 for plastic containers 500 may also comprise a pop-up cap that opens when pulled upward and closed when pressed downward, or a flip-top cap.

In various embodiments, the container 500 may be a glass container 500 for a beverage. In addition to the screw-on plastic caps described above, the closure 502 may comprise a metal closure 502 such as a crown cap that is crimped in place on the opening of the container. In various embodiments, the crown cap closure 502 may have a plurality of "teeth" extending outward as a result of the crimping process that may also serve to anchor a device to remove the crown cap closure 502.

According to various embodiments, the closure 502 may also comprise a liner that covers at least a portion of an interior surface of the closure 502. The closure may be constructed of any suitable material, such as a polymeric material (such as polyethylene, polyvinyl chloride, styrene, rubber, and the like) or cork. The liner may be clear or opaque, and may be suitable to accept printing thereon.

In various embodiments, the top label 300 may be rotatable about the base label 100, as discussed below. In these embodiments, the upper label panel 508 and lower label panel 510 may function to restrict upward and downward movement of the top label 300 in relation to the container 500 such that the top label 300 generally remains in a position covering at least a portion of the base label 100.

FIG. 5B illustrates the container 500 with the base label 100 affixed to the container 500. Initially, as illustrated in FIG. 5A, base label leading edge 102 is placed in contact with the recessed surface 512 of the container 500 and affixed to the container 500 by the leading edge adhesive strip 202. With relative motion between the container 500 and the base label 100, the base label 100 may be wrapped around the container 500 with the base label trailing edge 104 now overlapping the base label leading edge 102 such that the leading edge adhesive strip 202 holds the base label leading edge 102 to the container 500 while the trailing edge adhesive strip 204 holds the base label trailing edge 104 to the overlapped base label leading edge 102.

Figure 6:
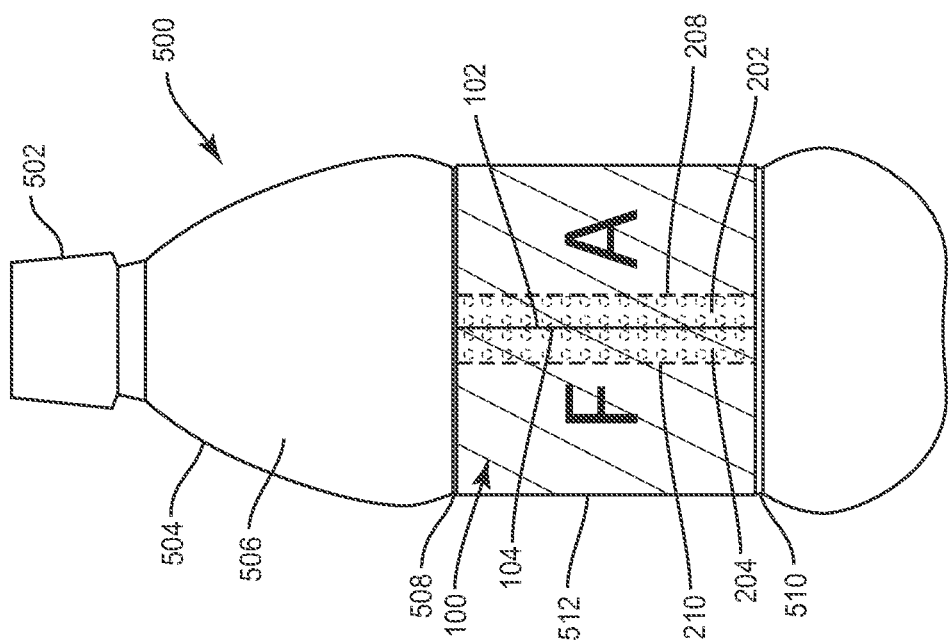
FIG. 6 illustrates an exemplary label secured about a container according to various embodiments.
Figure 7:
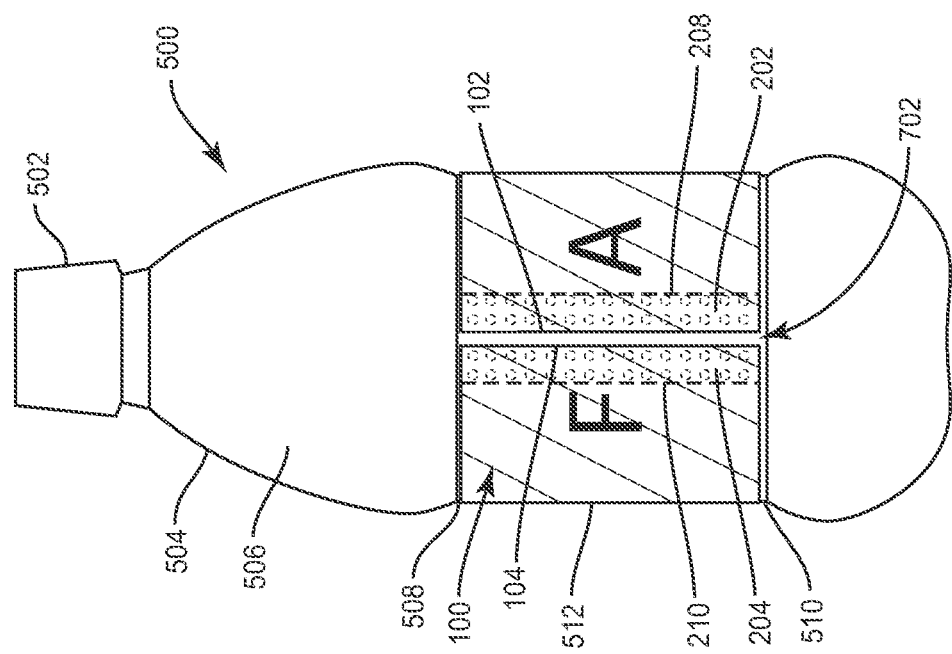
FIG. 7 illustrates an exemplary base label secured about a container according to various embodiments.

In various embodiments as illustrated in FIG. 6, the length of the base label 100 may be substantially the same as a circumference of the recessed surface 512 of the container 500, which may allow the base label leading edge 102 and base label trailing edge 104 to abut rather than overlap. However, it is also possible that the length of the base label 100 may be shorter than the circumference of the recessed surface 512, resulting in a gap 702 between the base label leading edge 102 and the base label trailing edge 104 when the base label 100 is affixed to the recessed surface as illustrated in FIG. 7. In both of these instances, the base label trailing edge adhesive strip 204 may adhere to the recessed surface 512 of the container 500, rather than the base label leading edge 102.

In various embodiments, the base label adhesive strips 202, 204 may comprise a permanent adhesive. In general, a permanent adhesive is one that does not readily release from a surface to which it adheres after the adhesive dries or cures. Using the base label 100 as an example, the permanent adhesive 202, 204 will tend not to release from the recessed surface 512, nor will it tend to release the base label leading edge 102 or trailing edge 104 once dried or cured. In order to remove the base label from the recessed surface 512, the base label 100 may have to be torn from the adhesive, or the adhesive layer 202, 204 may have to be fractured which may leave some of the adhesive on the recessed surface 512 and some of the adhesive on the base label leading edge 102 or trailing edge 104. Once the surfaces affixed with the permanent adhesive are separated, they may not be reattached.

Figure 8:
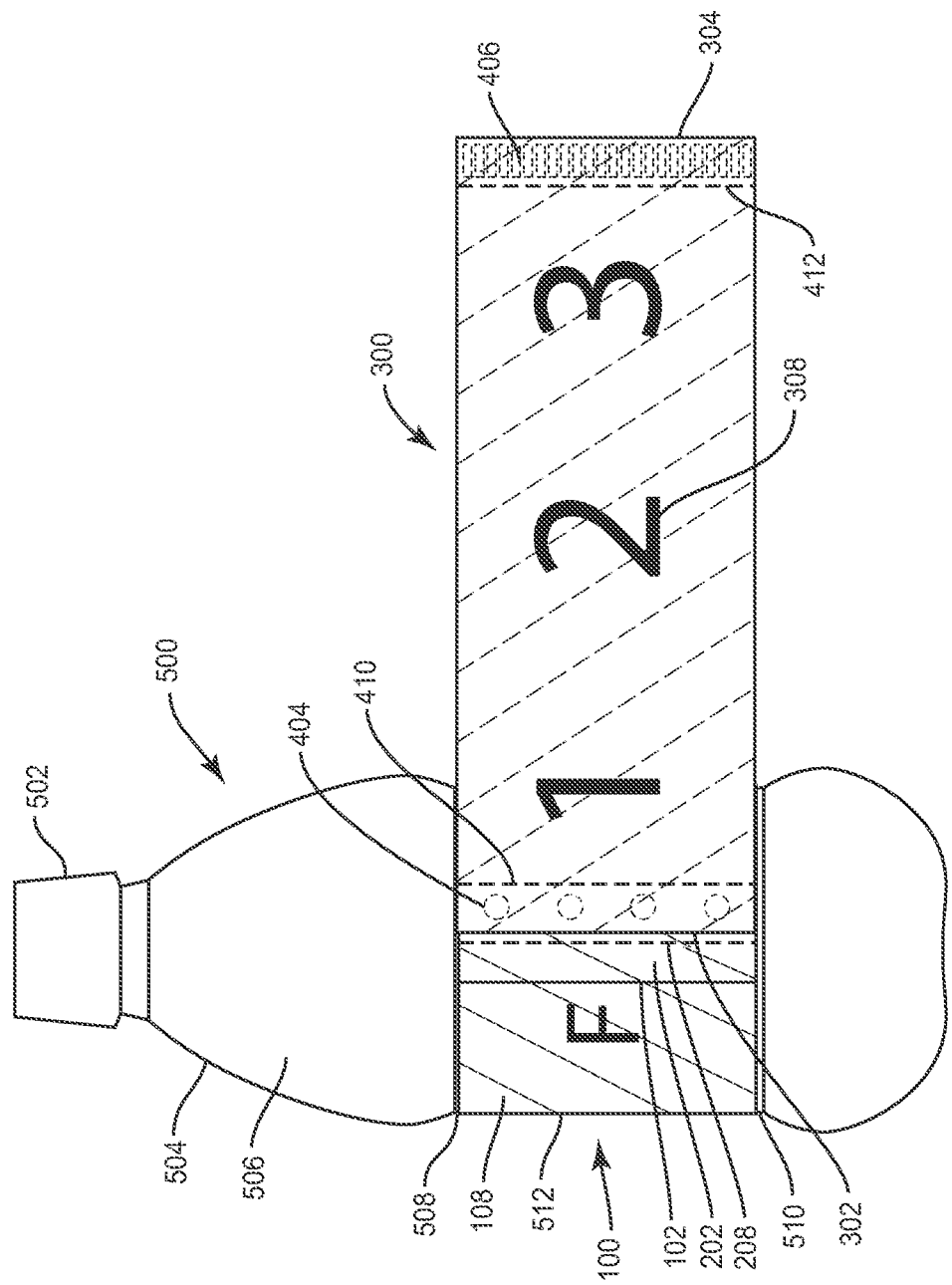
FIG. 8 illustrates a leading edge of an exemplary top label affixed to an exemplary base label according to various embodiments.

In FIG. 8, the base label 100 is already affixed to the recessed surface 512 of the container 500, and the application of the top label 300 over the base label 100 is illustrated according to various embodiments. The top label leading edge 302 may be placed in contact with any portion of the base label front surface 108 and affixed to the base label front surface 108 by the top label leading edge adhesive strip 404. With relative motion between the container 500 and the top label 300, the top label 300 may be wrapped around the container 500 with the top label trailing edge 304 now overlapping the top label leading edge 302 such that the top label leading edge adhesive strip 404 holds the top label leading edge 302 to the base label 100 while the top label trailing edge adhesive strip 406 holds the top label trailing edge 304 to the overlapped top label leading edge 302.

Figure 9:
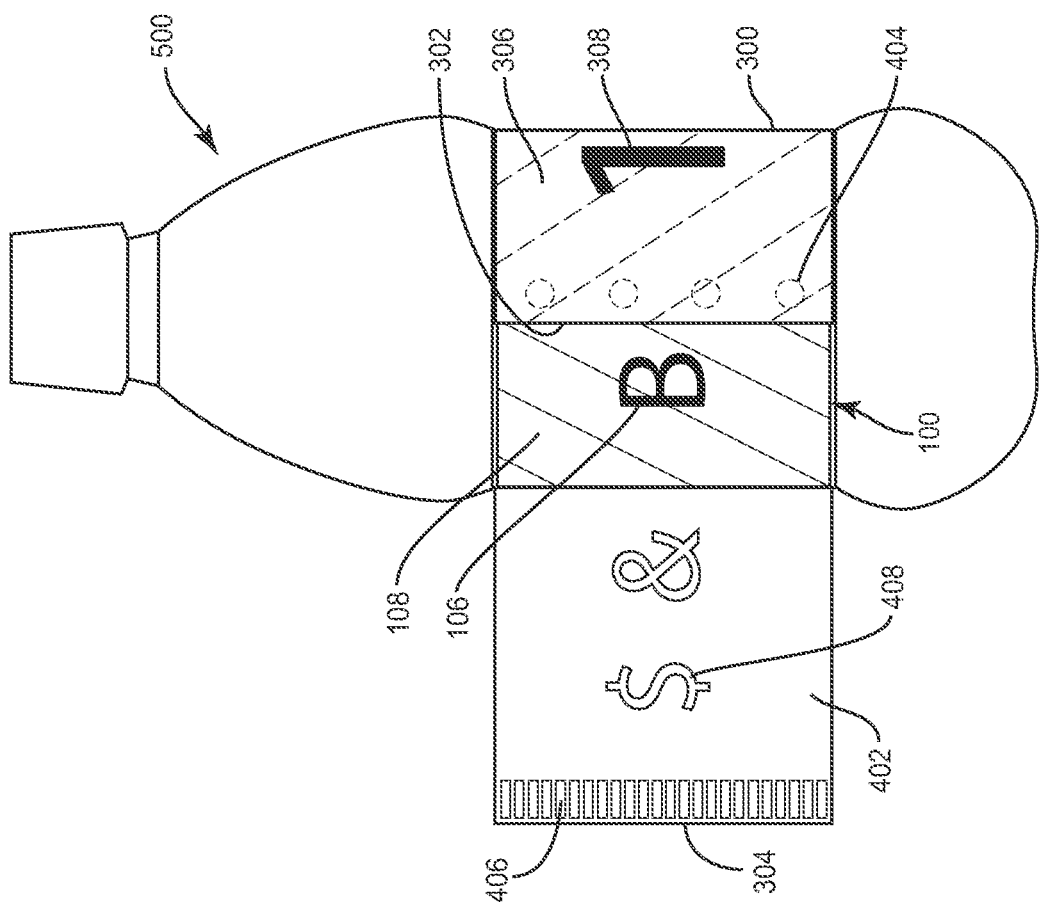
FIG. 9 illustrates an exemplary top label affixed to an exemplary base label and partially wrapped about a container according to various embodiments.

FIG. 9 illustrates the operation of the base label 100 and the top label 300 according to various embodiments. Beginning with the container 500 with the base label 100 and the top label 300 in place as shown, for example, in FIG. 6, the top label trailing edge 304 may be detached from the top label leading edge 302 and at least partially peeled back as shown in FIG. 9. The combination of the base label 100 and the top label 300 in this configuration increases the amount of surface area available for viewing by a consumer or user of the container 500. Prior to detaching the top label trailing edge 304, the consumer may view the top label front surface 306. Upon detaching the top label trailing edge 304, the consumer may now view the top label back surface 402 and the base label front surface 108 in addition to the top label front surface 306.

One of at least three types of adhesive may be used for the top label leading edge adhesive 404. A first type of adhesive is the permanent adhesive as described above for the base label 100. When a permanent adhesive is used for the top label leading edge adhesive 404, the top label leading edge generally cannot be detached without inflicting damage to one or both of the top label 300 or the base label 100. This may be desirable for various embodiments where the top label 300 is not intended to be removed from the container 500.

A second type of adhesive that may be used for the top label leading edge adhesive 404 is a releasable adhesive. A releasable adhesive is one that will release from a surface to which it is attached once a sufficient mechanical force is applied. A releasable adhesive may be used, for example, when the top label back surface 402 comprises a coupon for a subsequent purchase of a product. The releasable adhesive may allow the consumer to easily remove the top label 300 for later use. In various embodiments, the releasable adhesive may be a breakaway adhesive. A breakaway adhesive may have limited ability to withstand shear stresses. Shear stresses may cause the adhesive bond created between the label (e.g., top label 300) and the surface to which it is affixed (e.g., the base label 100 or container 500) to fail along the adhesive. In general, a releasable or breakaway adhesive may not re-attach to a surface once removed.

A third type of adhesive that may be used for the top label leading edge adhesive 404 is a resealable adhesive. A resealable adhesive may release from a surface to which it is attached once a sufficient mechanical force is applied, similar to the releasable adhesive described above. However, the resealable adhesive may be re-attached to a surface by applying pressure. A resealable adhesive may be desirable when the top label back surface 402 or the base label front surface 108 comprise information that may be needed only on occasion. Thus, the consumer or user may detach the top label 300 when the information is needed, then re-attach the top label 300.

In various embodiments, the top label trailing edge adhesive 406 may be a releasable adhesive or a resealable adhesive, depending on the intended use of the top label 300. As described above, if the surfaces 108, 402 comprise information that is intended to stay with the container, the top label trailing edge adhesive 406 may be a resealable adhesive. In contrast, if the top label 300 is intended to be removed from the container 500, a releasable adhesive may be desirable.

Figure 10:
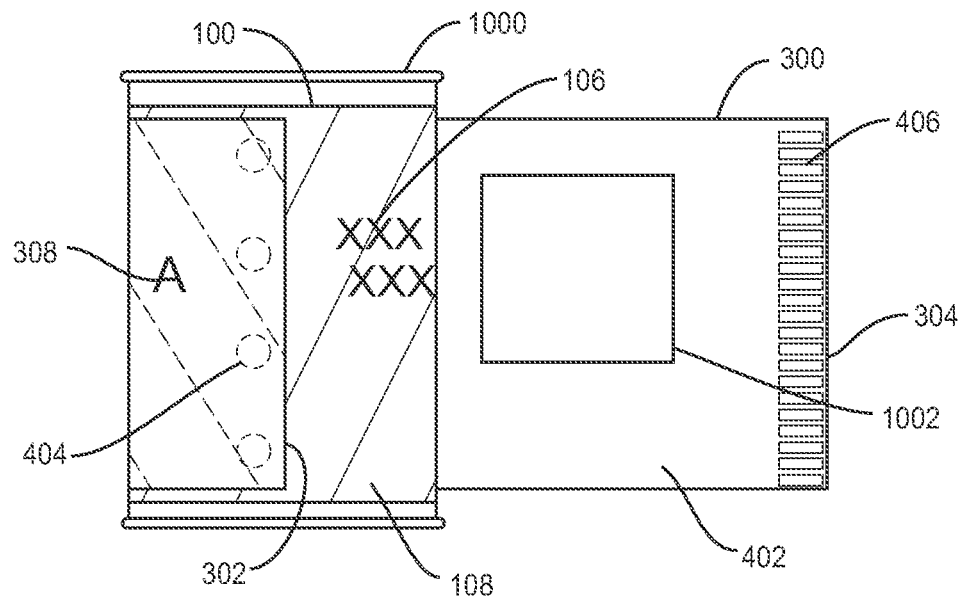
FIG. 10 illustrates an exemplary top label with a window affixed to an exemplary base label and partially wrapped about a container according to various embodiments.

FIG. 10 illustrates various embodiments of the top label 300 comprising a window 1002. The window 1002 may comprise a void in the top label 300 such that a portion of the base label 100 may be visible through the window. In various embodiments, the window 1002 may have a transparent covering (not shown). In various other embodiments, the window may comprise a transparent section of the top label 300 itself rather than a void. FIG. 10 illustrates the top label 300 partially wrapped about a container 1000, and base label 100 already in place on the container 1000. As shown, the top label leading edge adhesive 404 maintains the top label 300 coupled to the base label 100. The top label 300 may then be moved from the position illustrated in FIG. 10 to the position illustrated in FIG. 11 to secure the top label 300 about the container 1000. Top label trailing edge adhesive 406 may couple to the top label leading edge 302 if the top label leading edge 302 and trailing edge 304 overlap; otherwise, the top label trailing edge adhesive 406 may be coupled to the base label front surface 108.

Figure 11:
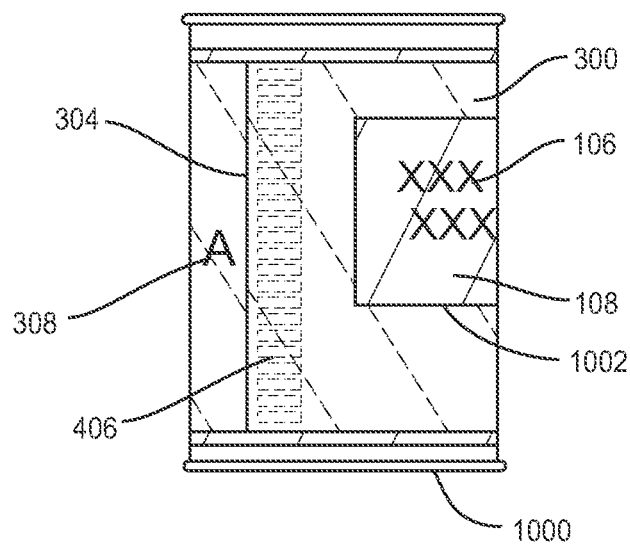
FIG. 11 illustrates an exemplary top label with a window secured about a container and a portion of a base label visible through the window according to various embodiments.

Once the top label 300 is in position on the container 1000 as illustrated in FIG. 11, at least a portion of the base label front surface printed label information 106 may be visible through the window 1002. This may allow viewing of a first portion of the base label 100 without removing the top label 300. In various embodiments, the top label leading edge adhesive 404 may be a breakaway adhesive. Rotation of the top label 300 relative to the base label 100 may exert shear stresses on the breakaway adhesive, causing the adhesive bond affixing the top label leading edge 302 to the base label 100 to fail. The top label 300 may then be freely rotatable about the base label 100, and a second portion of the base label 100 may be visible when the top label 300 is rotated to a second position. The window 1002 may be rectangular as illustrated in FIGS. 10 and 11, or any other shape as needed for a particular application. For example, the window 1002 may be a slit that reveals an alphanumeric string on the base label 100. In various embodiments, the top label 300 may comprise more than one window 1002. Various embodiments in which the top label trailing edge adhesive 406 is a resealable or releasable adhesive may allow the top label 300 to be peeled back to reveal the top label back surface 402 and essentially the entire base label front surface 108 or to be removed from the container 1000, in addition to being rotatable.

One skilled in the art will readily recognize that labels may be applied to containers using a variety of methods and that there may be a variety of single-label and multi-label systems other than those described above. Any such application methods or label systems may be used with the present disclosure. The above descriptions are exemplary and not to be construed as limiting in any way. Examples of other application methods and label systems may be disclosed in U.S. Pat. Nos. 5,884,421, 6,086,697, 6,237,269, 6,402,872, 6,631,578, 6,649,007, 7,087,298, and 7,172,668.

Figure 12:
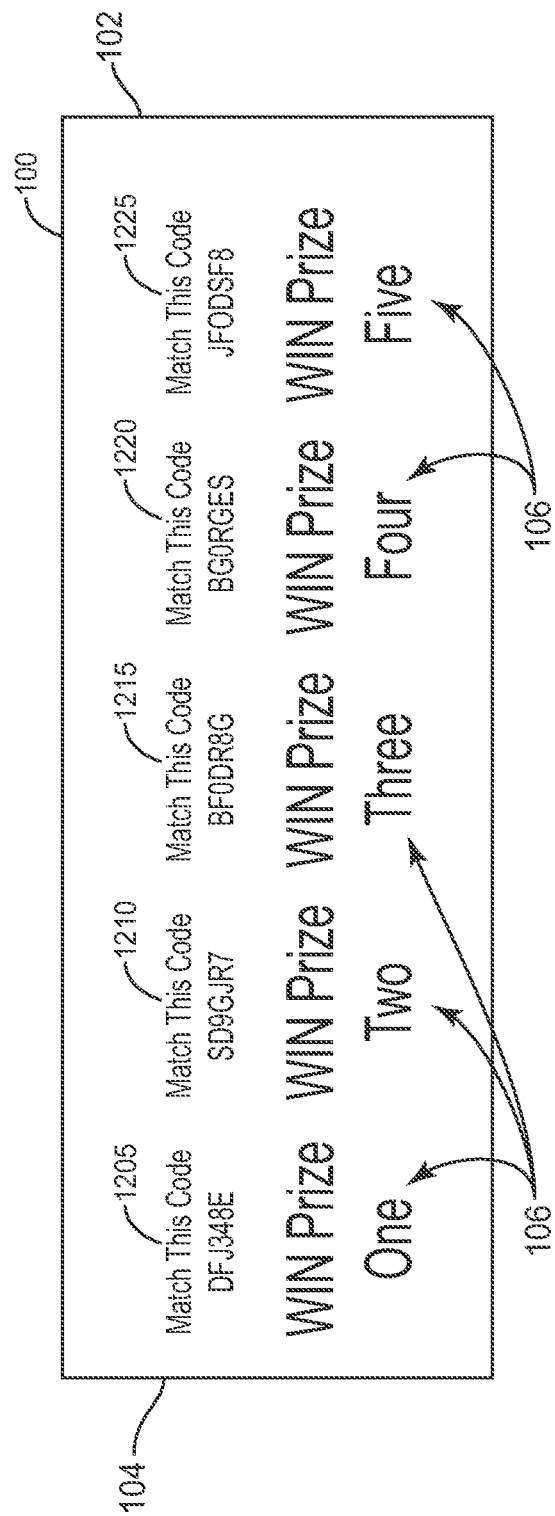
FIG. 12 is a front view of a base label according to various embodiments.
Figure 13:
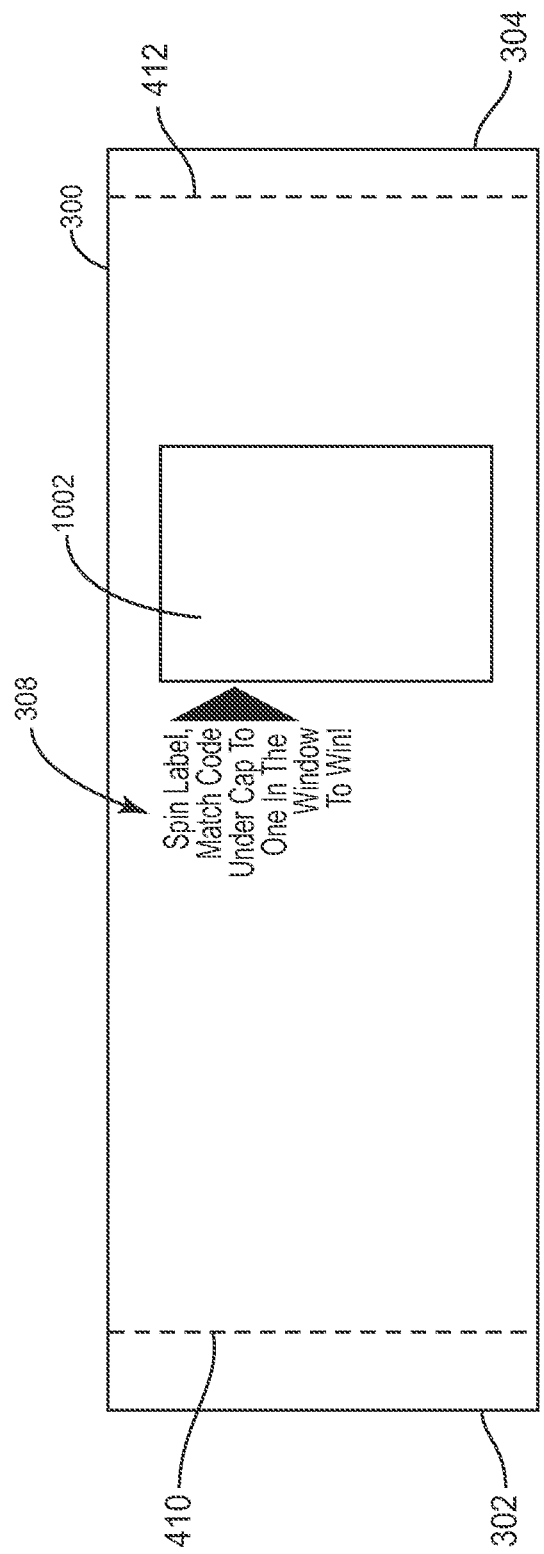
FIG. 13 is a front view of a top label with a transparent window according to various embodiments.

In various embodiments, the base label 100 and an opaque rotatable top label 300 in combination with the closure 502 may comprise an interactive and coordinated system that may increase user interaction with the container. FIGS. 12 and 13 illustrate various embodiments of a base label 100 and top label 300, respectively, that may comprise the label portion of the interactive system. The printed label information (or indicia) 106 on the base label 100 may comprise a plurality of game or contest related information. According to the various embodiments of FIG. 12, the printed label information 106 may comprise a plurality of alphanumeric codes 1205-1225. The alphanumeric codes 1205-1225 may all be unique, or two or more may be identical.

The top label 300 may include indicia 308 comprising instructions for how to use the interactive system. Indicia 308 may also comprise product-related information, safety-related information, manufacturer-related information, and the like. In various embodiments, the top label 300 may contain a transparent window 1002 as described previously (see FIG. 10) and may be rotatable about the container 500. The transparent window 1002 may reveal a first portion of the printed label information 106 (e.g., first alphanumeric code 1205) when rotated to a first position about the container 500, and may reveal a second portion of the printed label information 106 (e.g., second alphanumeric code 1210) when rotated to a second position about the container 500.

Figure 14:
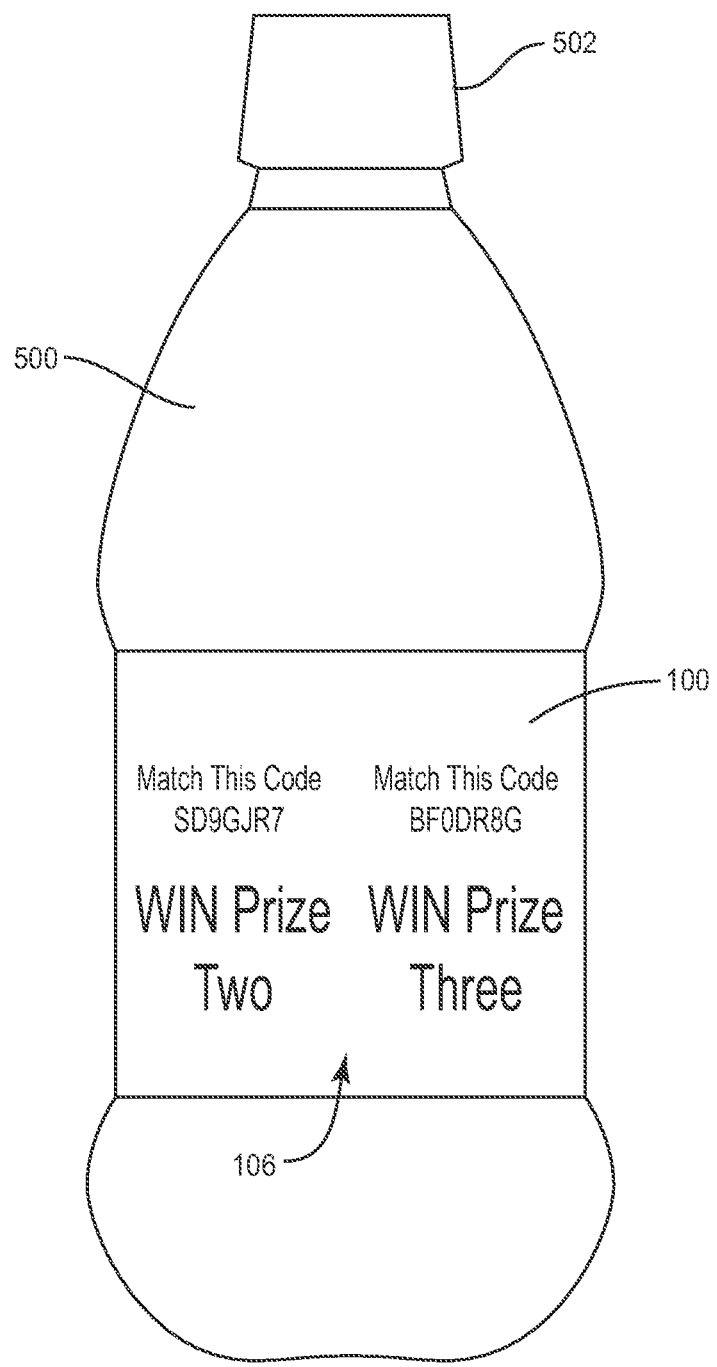
FIG. 14 illustrates an exemplary base label secured about a container according to various embodiments.

FIGS. 14 through 23 illustrate the base label 100 and top label 300 on a beverage container 500 according to various embodiments. In FIG. 14, the base label 100 is positioned on the container 500, and the base label 100 may comprise the printed label information 106. The printed label information 106 may comprise the alphanumeric codes 1205-1225, or may be any other information as known in the art that may be incorporated into an interactive system. While various embodiments of the printed label information 106 are illustrated in FIGS. 14 through 23, one skilled in the art will readily recognize that these exemplary embodiments are not limiting in any way and that a wide variety of numbers, symbols, games, puzzles, and the like may comprise the printed label information 106.

Figure 15A:
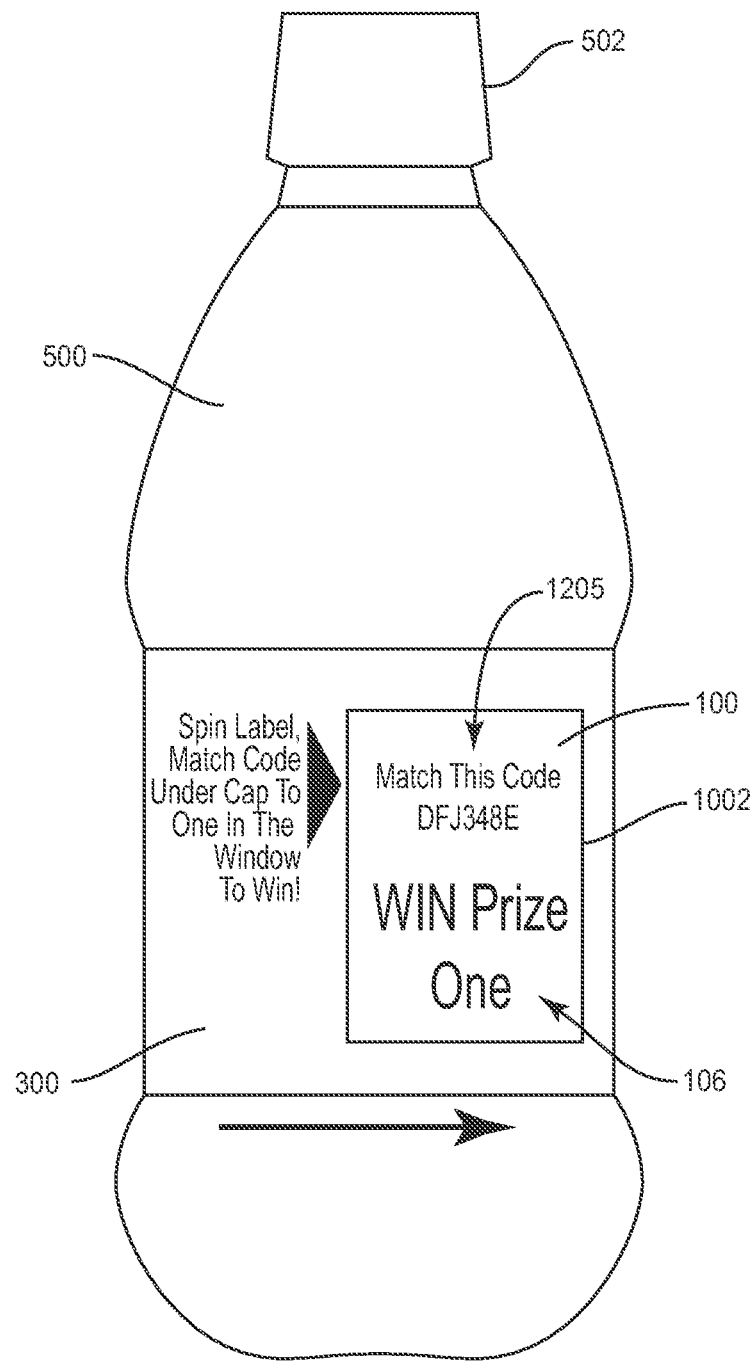
FIG. 15A illustrates an exemplary base label and top label secured about a container according to various embodiments.

FIG. 15A illustrates the rotatable top label 300 in place over the base label 100 on the container 500 according to various embodiments. The base label 100 and top label 300, in conjunction with the closure 502 may comprise an interactive and coordinated system to motivate a consumer to become more highly involved in contests, games, or other information delivery related to the product in the container 500. For example, a common practice in the beverage industry is to place a code on an interior surface of the closure 502 such that the code is not visible until the closure 502 is removed from the container 500. The code may be printed on an interior surface of the closure 502 and then covered with a transparent or semi-transparent liner, or the code may be printed on the liner. The consumer may use the code in a game or contest in an attempt to win a prize. The dual-label and closure system according to various embodiments may provide the beverage manufacturer with additional label space for relaying information about the game or contest. The dual label and closure system may take the place of additional literature that must be produced and placed near the beverage containers in stores that explains the promotion, while still providing sufficient label space for mandatory information such as nutritional information, ingredients, bar codes, and the like.

Figure 15B:
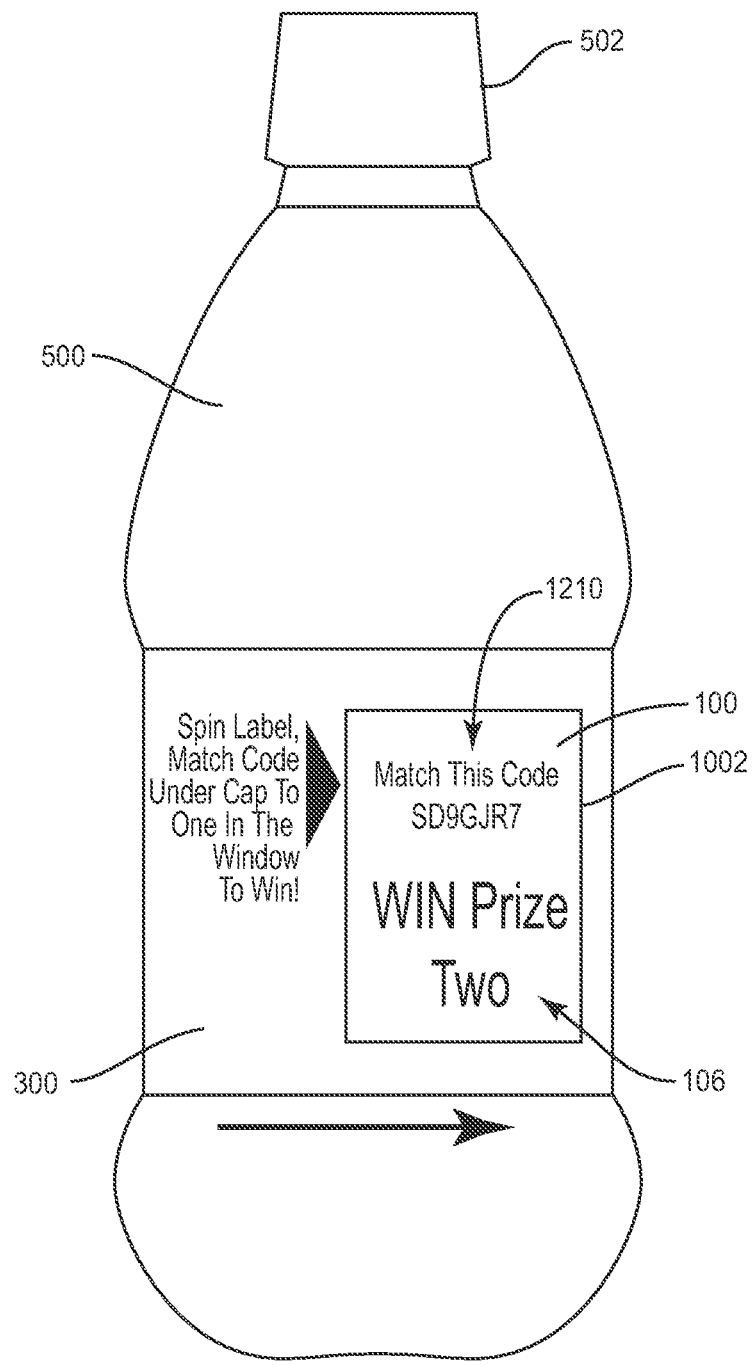
FIG. 15B illustrates an exemplary base label and top label secured about a container according to various embodiments.
Figure 15C:
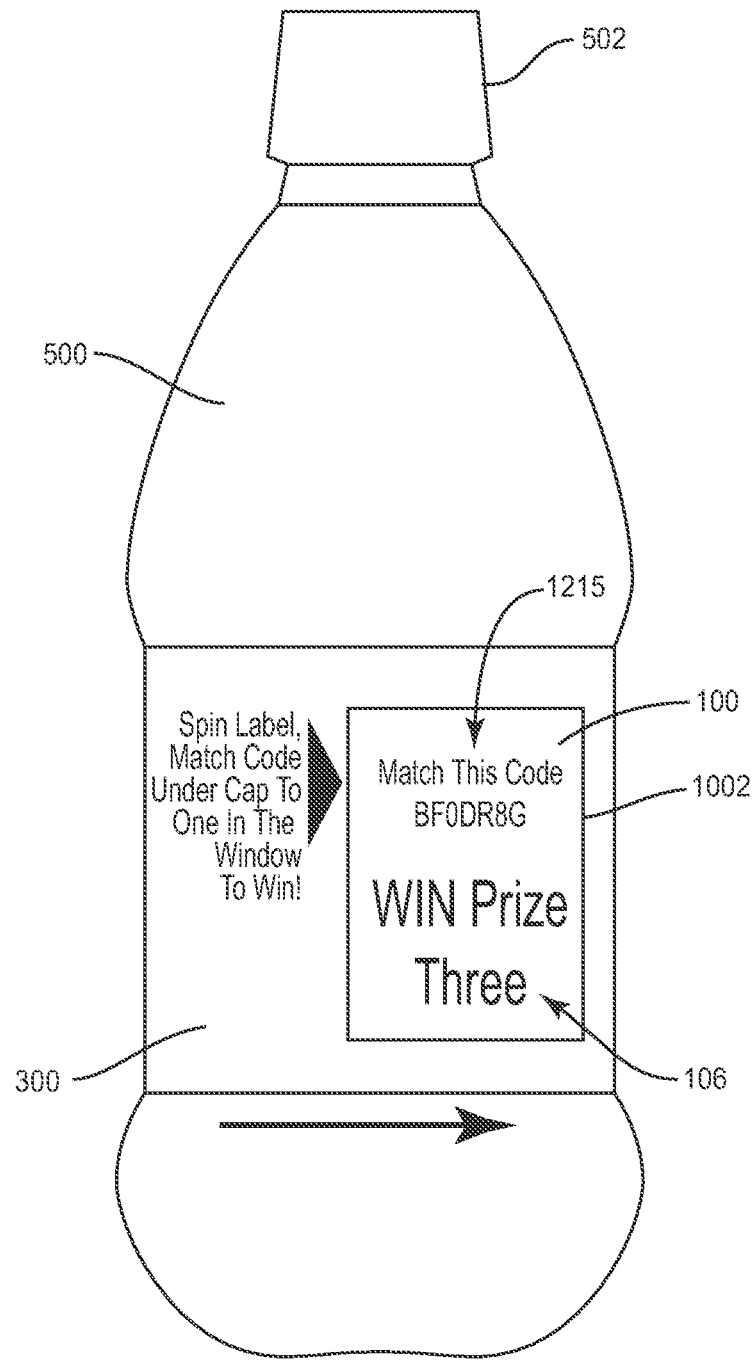
FIG. 15C illustrates an exemplary base label and top label secured about a container according to various embodiments

Returning to FIG. 15A, the top label 300 is positioned such that a first portion of printed label information 106 is visible through the transparent window 1002. As shown in FIG. 15A, the first portion of printed label information 106 comprises at least in part the alphanumeric code 1205. The alphanumeric code 1205 (as well as any other alphanumeric codes 1210-1225 as illustrated in FIG. 12) may comprise any combination of random letters, numbers, and symbols; may spell out words or phrases in any language; may be numbers that correspond to a numeral system other than base 10, such as binary; or any other alphanumeric representation known in the art. As described previously, the top label 300 may be applied such that the top label 300 is rotatable around a circumference of the container 500. In FIG. 15B, the top label 300 has been rotated in the direction of the arrow revealing at least a second portion of the printed label information 106 through the transparent window 1002 in the top label 300. The second portion of the printed label information 106 may comprise the second alphanumeric code 1210. Similarly, FIG. 15C illustrates the top label 300 further rotated in the direction of the arrow, thus revealing a third portion of the printed label information 106 through the transparent window 1002 of the top label 300. The third portion of the printed label information 106 may comprise the third alphanumeric code 1215. Although FIGS. 15A-15C illustrate a single portion of the printed label information 106 visible through the transparent window 1002, two or more portions of the printed label information 106 may simultaneously be visible through the transparent window 1002 in various embodiments.

Figure 16A:
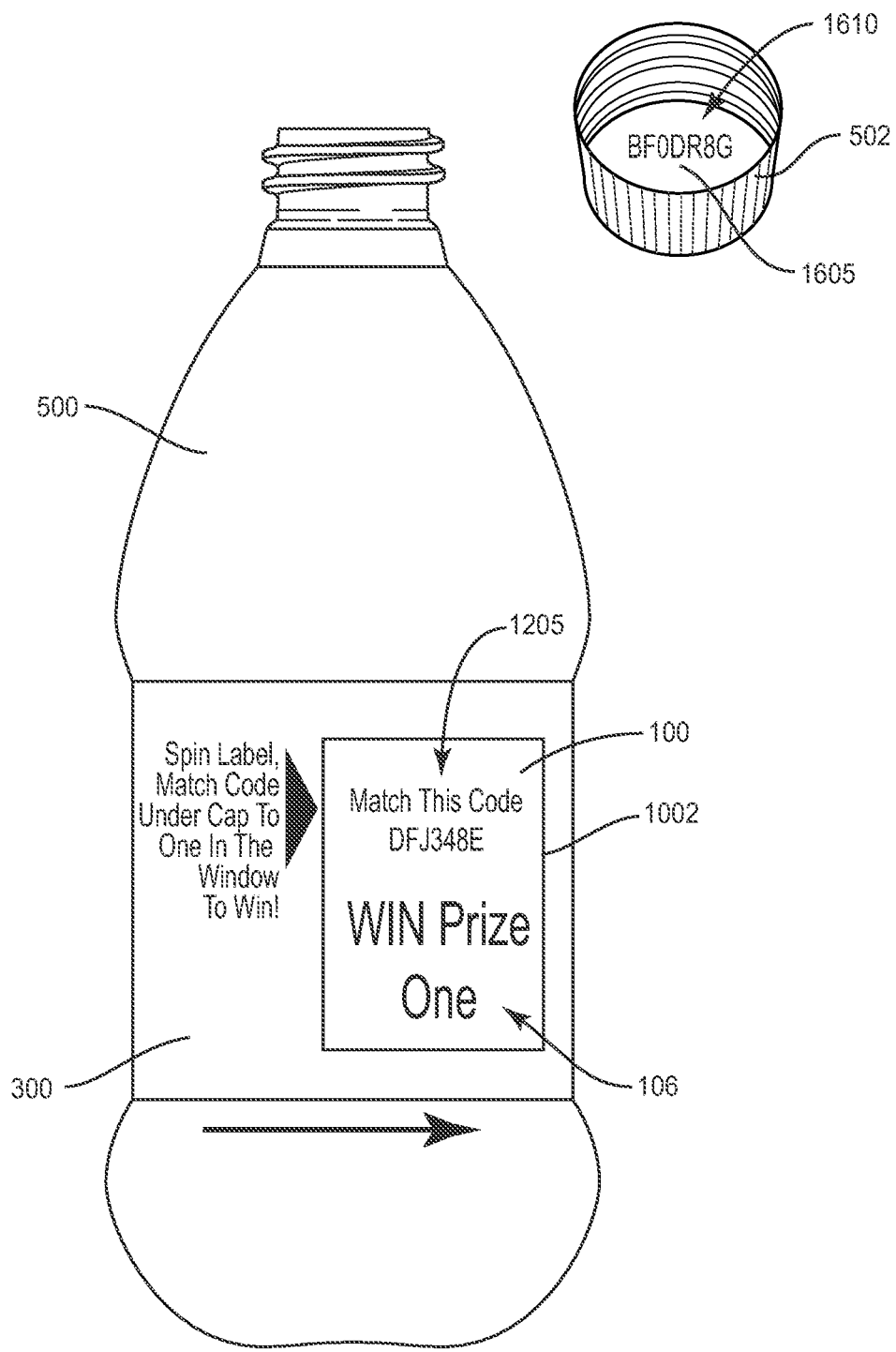
FIG. 16A illustrates an exemplary base label and top label secured about a container and a closure removed from the container according to various embodiments.
Figure 16B:
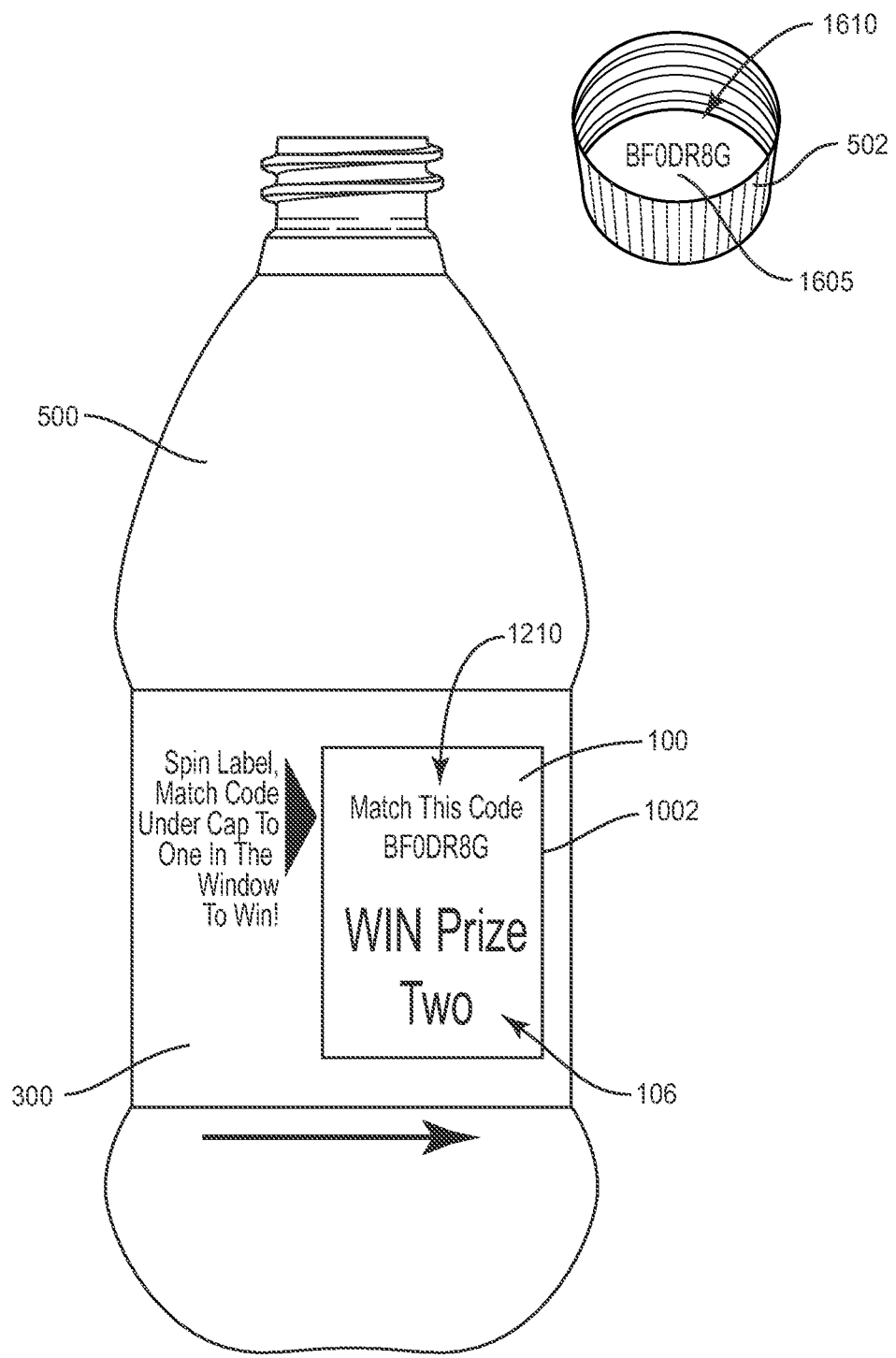
FIG. 16B illustrates an exemplary base label and top label secured about a container and a closure removed from the container according to various embodiments.
Figure 16C:
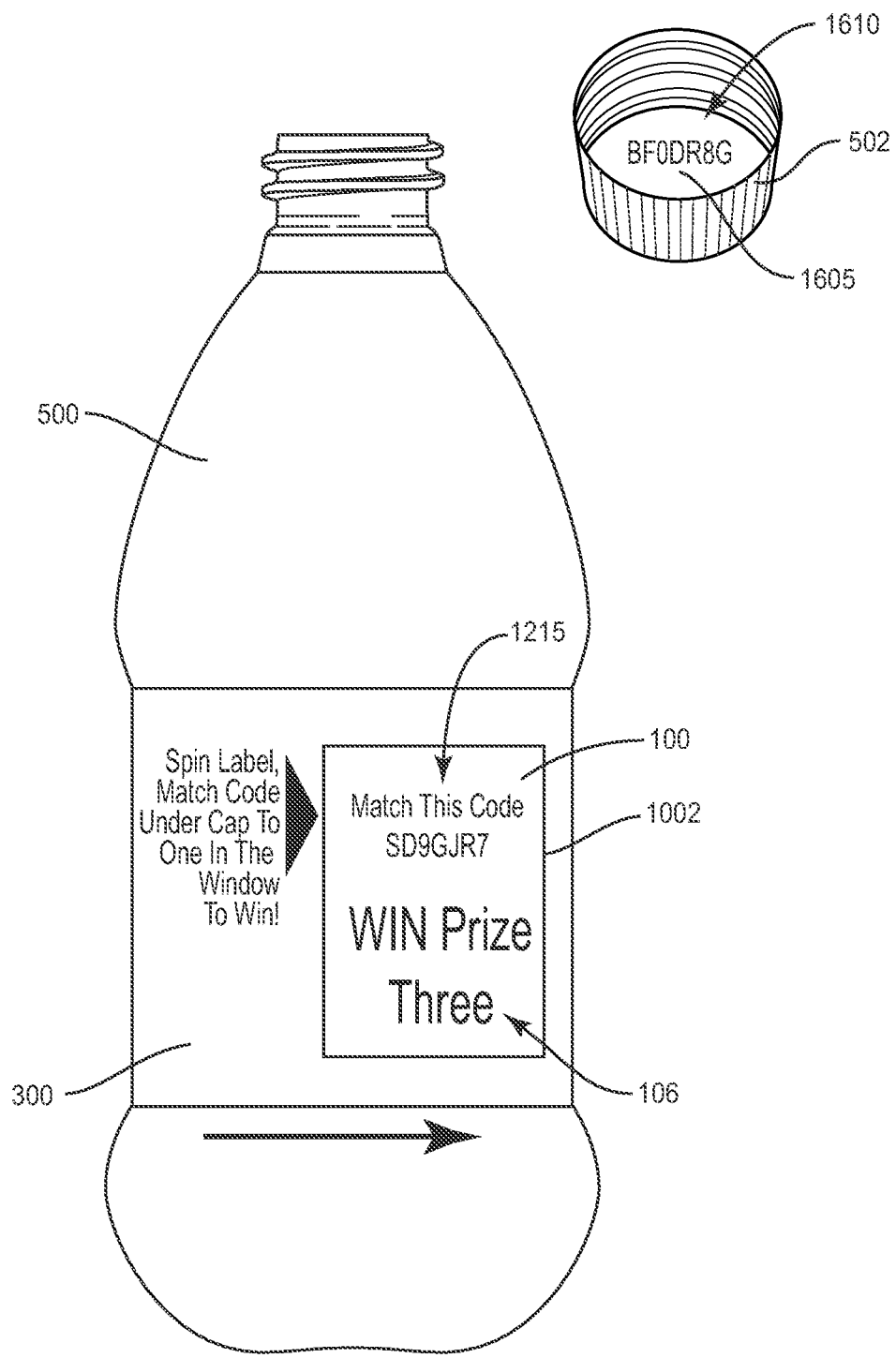
FIG. 16C illustrates an exemplary base label and top label secured about a container and a closure removed from the container according to various embodiments.

FIG. 16A illustrates the container 500, base label 100, top label 300, printed label information 106 and first alphanumeric code 1205 as in FIG. 15A, now with the closure 502 removed from the container 500 according to various embodiments. Removing the closure 502 from the container 500 reveals an interior portion 1610 of the closure 502. Printed closure information may be placed within the interior portion 1610 of the closure 502. In various embodiments, the printed closure information may be an alphanumeric code 1605 as illustrated in FIG. 16A. After removing the closure 502 from the container 500, the consumer may compare the closure alphanumeric code 1605 with the label first alphanumeric code 1205. In the exemplary embodiment of FIG. 16A, the two alphanumeric codes 1205, 1605 do not match, and the consumer would not win Prize One. As illustrated according to various embodiments in FIG. 16B, the consumer rotates the top label 300 in the direction of the arrow to reveal the label second alphanumeric code 1210. In this exemplary embodiment, the two codes 1210, 1605 match and the consumer would win Prize Two. In FIG. 16C, the consumer again rotates the top label 300 in the direction of the arrow to reveal the label third alphanumeric code 1215. Since the two alphanumeric codes 1215, 1605 do not match, the consumer would not win Prize Three.

Figure 17:
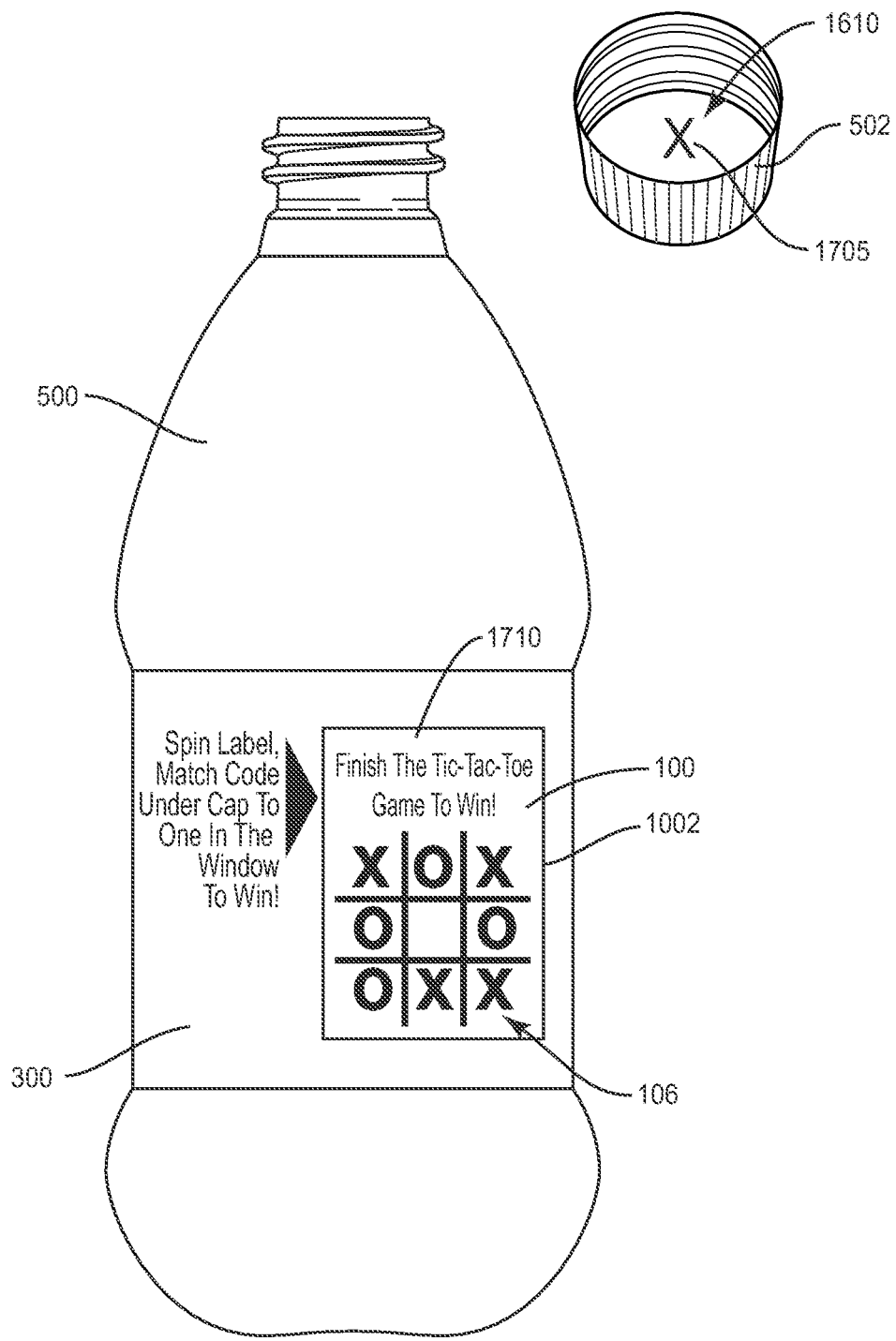
FIG. 17 illustrates an exemplary base label and top label secured about a container and a closure removed from the container according to various embodiments.

As described previously, the printed label information 106 may comprise a wide variety of alphanumeric codes, pictures, words, games, and contests. FIGS. 17 through 21 illustrate exemplary embodiments of a variety of printed label information used with the interactive and coordinated label and closure system. FIG. 17 illustrates the printed label information 106 in the form of a tic-tac-toe game 1710. In this example, one space in the tic-tac-toe game 1710 is left blank, and the printed closure information comprises a tic-tac-toe mark, "X" 1705. The consumer wins the game if the tic-tac-toe mark 1705 in the closure 502 completes three like marks in a row in the tic-tac-toe game 1710 in the printed label information 106. Although not shown, the consumer may rotate the top label 300 to reveal additional tic-tac-toe games 1710.

Figure 18:
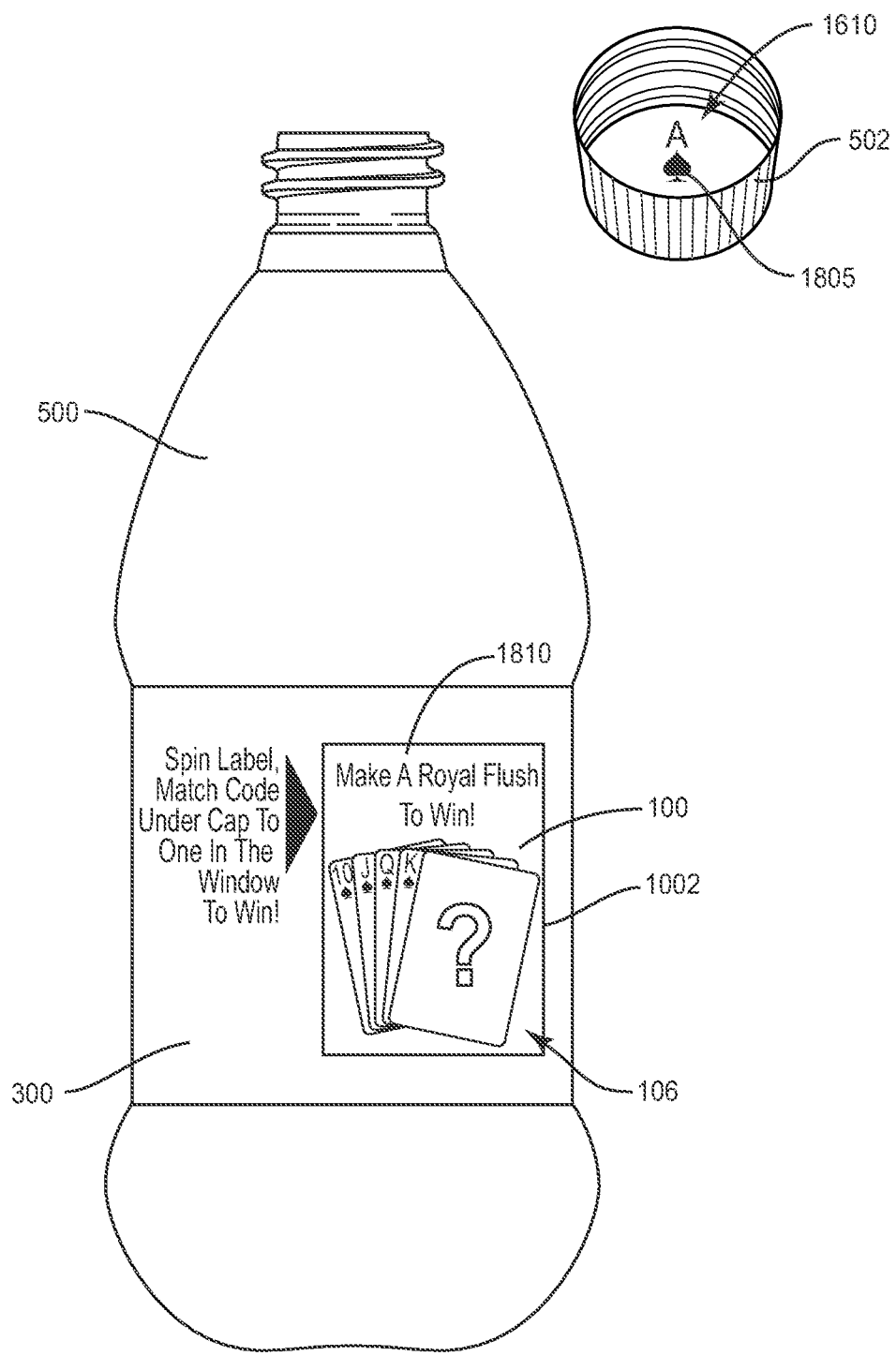
FIG. 18 illustrates an exemplary base label and top label secured about a container and a closure removed from the container according to various embodiments.

In various embodiments as illustrated in FIG. 18, the printed label information 106 may comprise a plurality of playing cards 1810. In this example, the plurality of playing cards 1810 comprises four cards, and the printed closure information comprises an additional playing card 1805. The additional playing card 1805 may be combined with the four playing cards 1810 in the printed label information 106 to form a poker hand. If the combination of the four playing cards 1810 and the additional playing card 1805 forms a designated combination, then the consumer may win the game. In various embodiments, the printed label information 106 may comprise another set of five playing cards (not shown) designated, for example, as "the dealer." In this example, the poker hand formed by the combination of the four playing cards 1810 and the additional playing card 1805 in the closure 502 would have to be a higher rank than "the dealer" to win. Additionally, various embodiments may comprise card games other than poker, such as blackjack, solitaire, and the like. In some embodiments, the printed label information 106 and the additional playing card 1805 in the closure 502 may each comprise a single playing card, wherein the consumer would win the game if the additional playing card 1805 is a higher rank than the single playing card 1810 in the printed label information 106.

Figure 19:
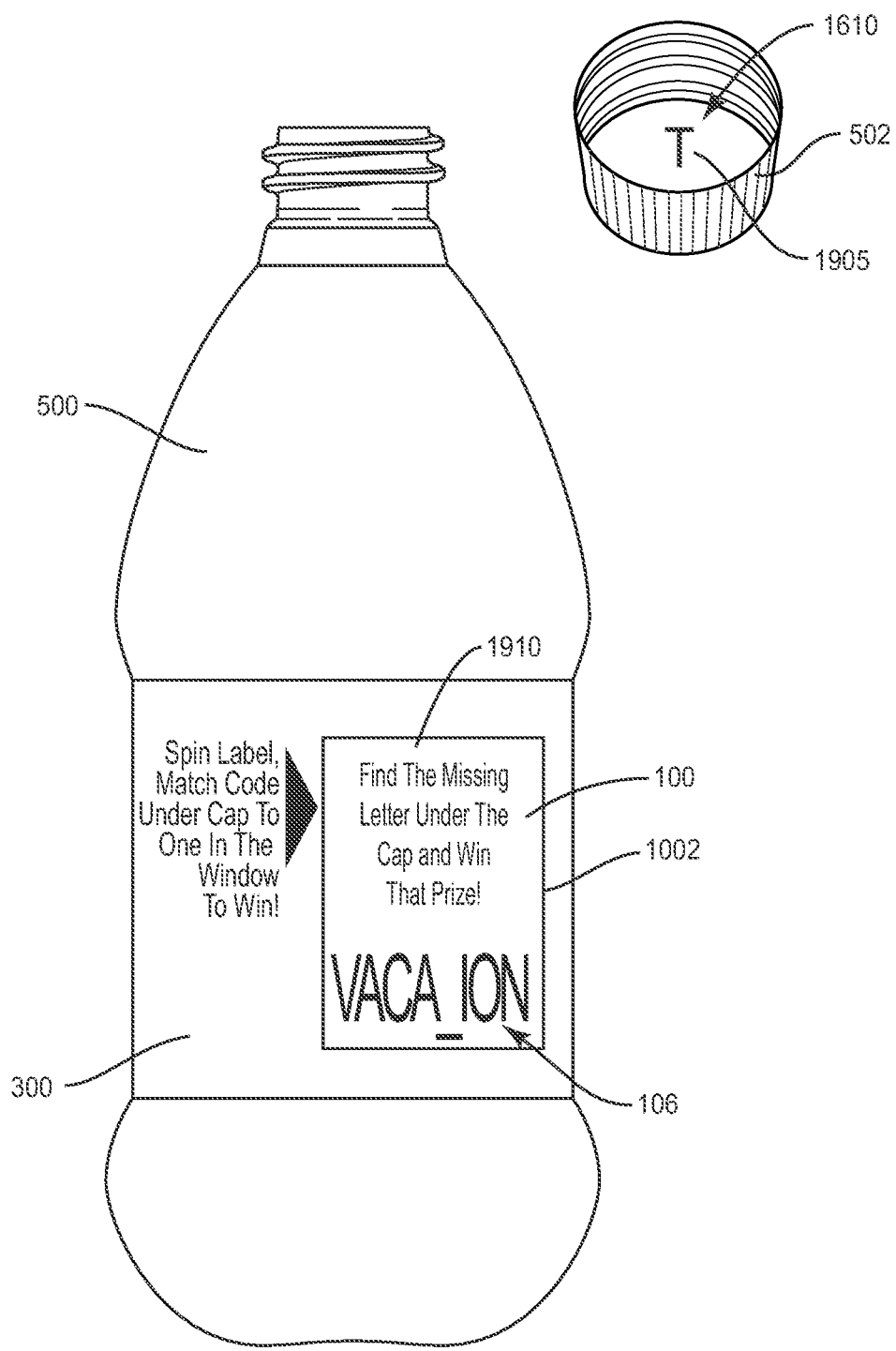
FIG. 19 illustrates an exemplary base label and top label secured about a container and a closure removed from the container according to various embodiments.

FIG. 19 illustrates various embodiments in which the printed label information 106 comprises a word 1910 with a letter missing. The printed closure information may comprise a single letter 1905. The consumer may win the game if the single letter 1905 in the printed closure information correctly completes the word 1910 in the printed label information 106. In various embodiments, the word 1910 may have more than one letter missing, and the printed closure information may comprise more than one letter 1905.

Figure 20:
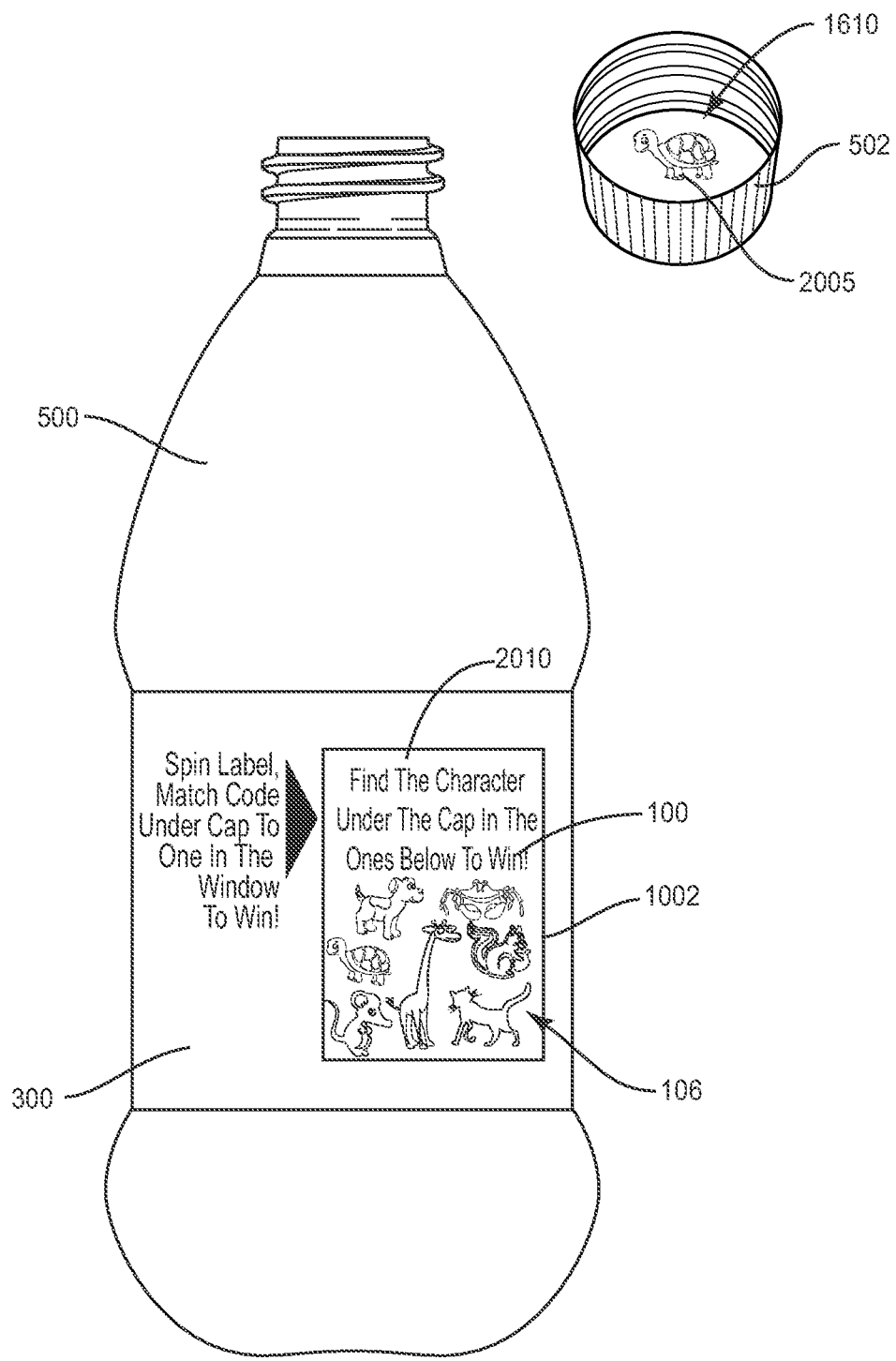
FIG. 20 illustrates an exemplary base label and top label secured about a container and a closure removed from the container according to various embodiments.

In the various embodiments illustrated in FIG. 20, the printed label information 106 may comprised one or more pictures 2010 (in this example, pictures of various animals), and the printed closure information may also comprise one or more pictures 2005. The consumer may win the game if the one or pictures 2005 in the closure 502 match one or more of the pictures 2010 in the printed label information 106. In various embodiments, the pictures 2005, 2010 may be of animals, humans, faces, flowers, trees, and the like, and may also be distinguished by color.

Figure 21:
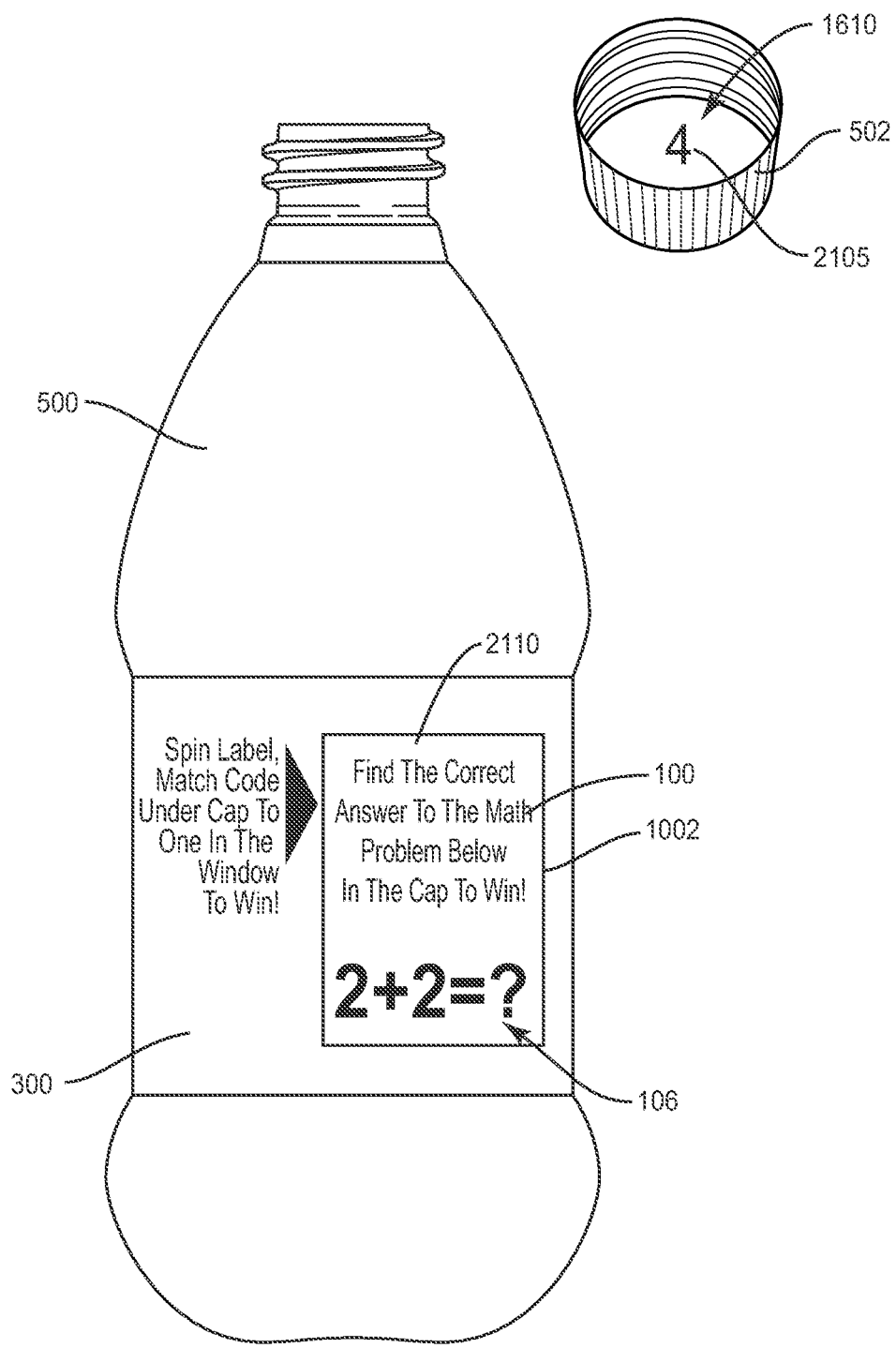
FIG. 21 illustrates an exemplary base label and top label secured about a container and a closure removed from the container according to various embodiments.

FIG. 21 illustrates various embodiments in which the printed label information 106 may comprise a mathematical expression 2110, and the printed closure information may comprise a number 2105. The consumer may win the game if the number 2105 in the closure 502 is the correct answer to the mathematical expression 2110.

Figure 22:
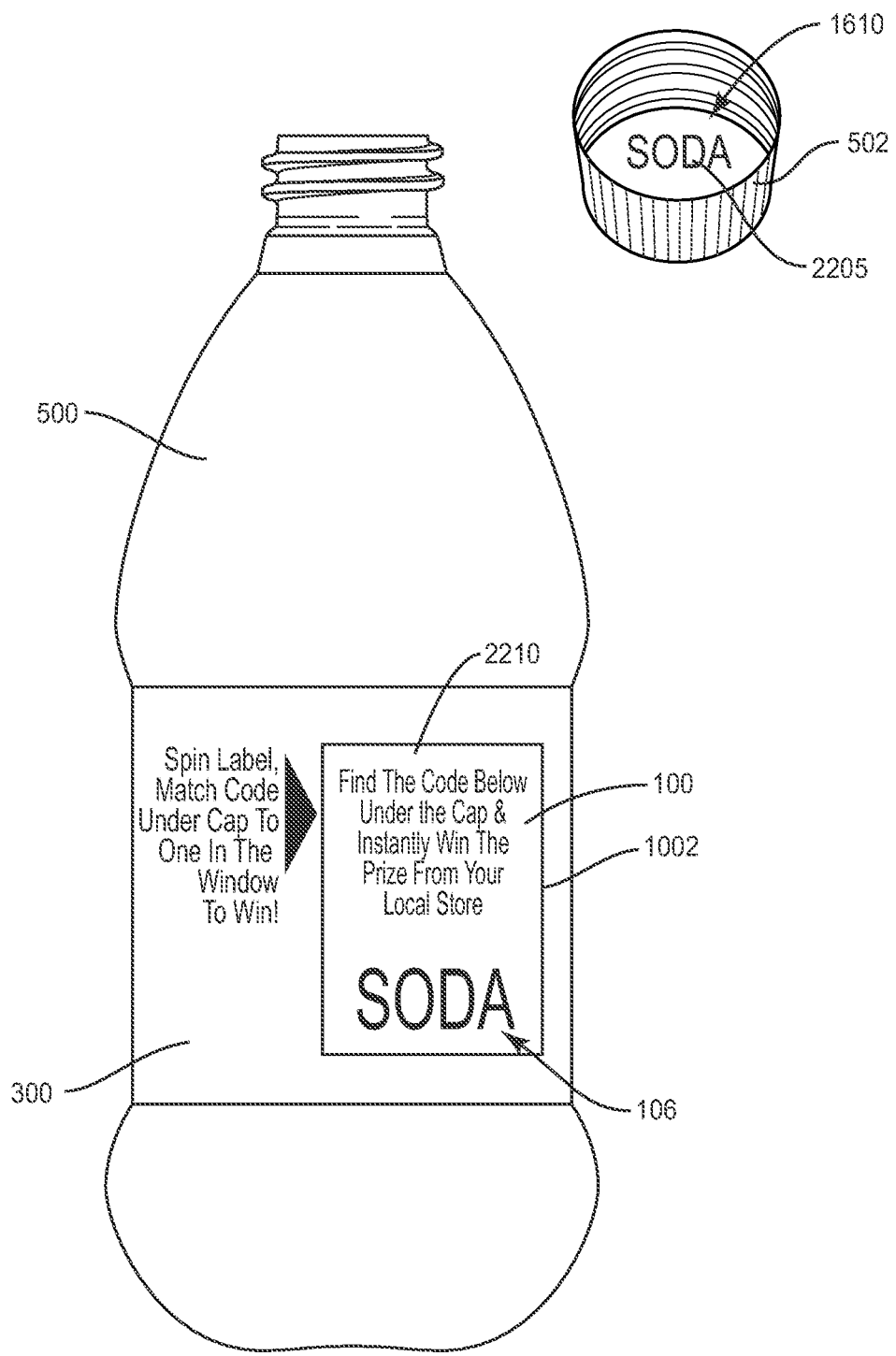
FIG. 22 illustrates an exemplary base label and top label secured about a container and a closure removed from the container according to various embodiments.

FIG. 22 illustrates various embodiments in which the printed label information 106 may comprise a complete word 2210, and the printed closure information may also comprise a complete word 2205. The consumer may win the game if the word 2205 in the closure 502 matches the word 2210 in the printed label information 106.

Figure 23:
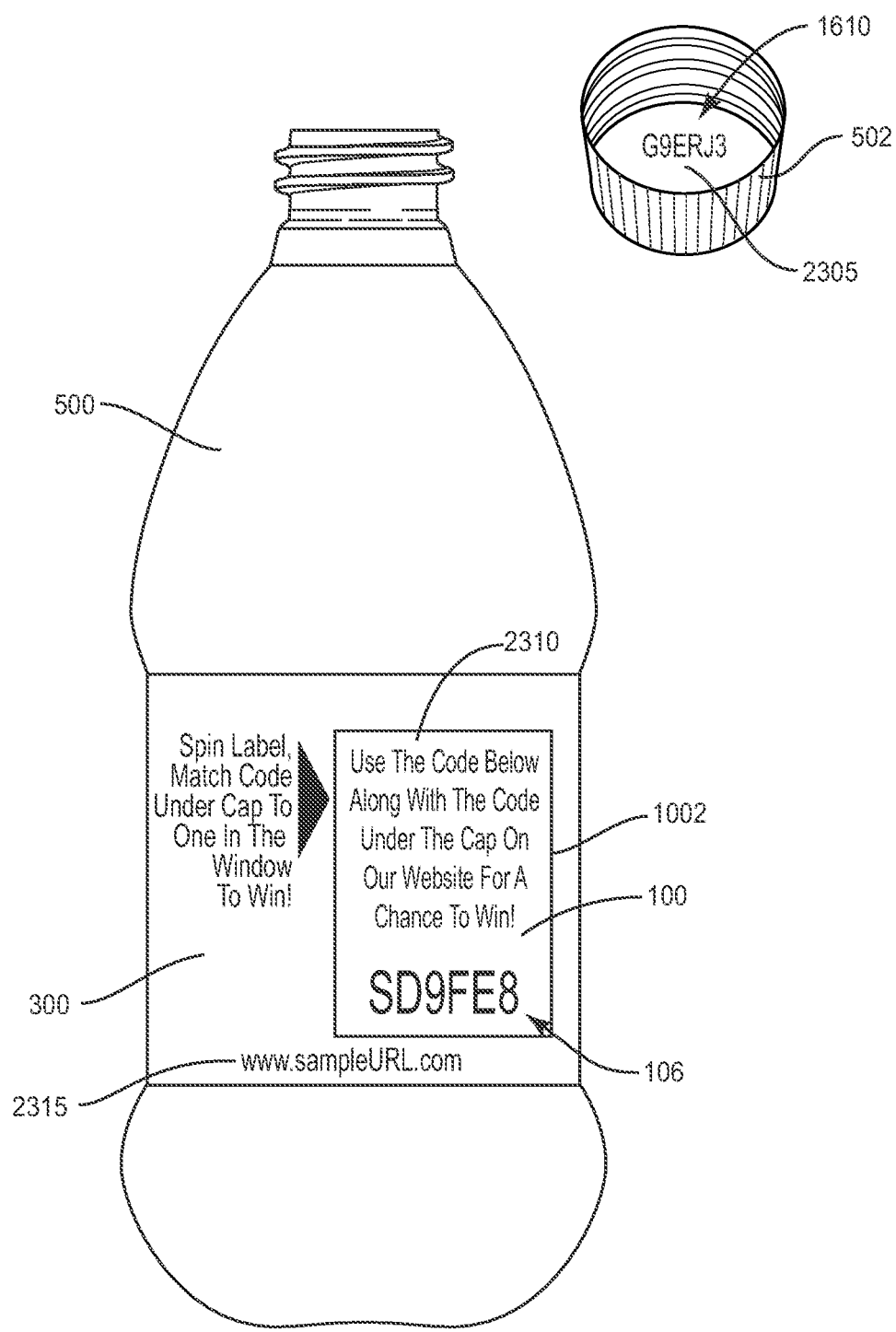
FIG. 23 illustrates an exemplary base label and top label secured about a container and a closure removed from the container according to various embodiments.

Various embodiments may increase user interaction with the product and the manufacturer of the product as illustrated in FIG. 23. The top label 300 may comprise a URL 2315 for a website. Although not shown, the URL 2315 may also be placed on the base label 100 such that the URL 2315 is visible through the transparent window 1002. The printed label information 106 may comprise an alphanumeric code 2310, and the printed closure information may also comprise an alphanumeric code 2305. In contrast to the previous examples where the consumer would immediately determine whether they won the game by comparing the printed closure and label information, the various embodiments of FIG. 23 would motivate the consumer to visit the website designated by the URL 2315 and enter the closure alphanumeric code 2305 and the label alphanumeric code 2310 at the website. The website would then inform the consumer if they are a winner. The website may also display a variety of marketing information to the consumer about the product in the container 500 or other products. In various embodiments, the consumer may rotate the top label 300 such that additional label alphanumeric codes 2310 are revealed. The consumer may then enter these additional alphanumeric codes at the website for additional chances to win.

In various embodiments, one or more of the URL 2315, label alphanumeric code 2310, and the closure alphanumeric code 2305 may be machine readable. The consumer may use any electronic device, such as a smartphone, to read or scan the URL 2315, label alphanumeric code 2310, and the closure alphanumeric code 2305. The smartphone may comprise an application that enables a reading or scanning function on the smartphone. Once the smartphone (or other electronic device such as a tablet computer or scanner coupled to a computer) reads or scans the URL 2315, label alphanumeric code 2310, and the closure alphanumeric code 2305, the application may be configured to cause the smartphone to execute a function. In the embodiment of FIG. 23, the function executed by the smartphone may be to open a web browser program and direct the browser to a website designated by the URL 2315. In various embodiments, a barcode or any other machine readable indicia may be used in place of the URL 2315.

The top label 300 may comprise a dual ply (or multi-ply) construction in which a ply in contact with the base label 100 is a material selected for low sliding friction characteristics. The low sliding friction characteristics may enhance the ease of rotating and sliding the top label 300 about the base label 100. In various embodiments, the top label 300 ply in contact with the base label 100 may be coated with a substance to impart the low sliding friction characteristics.

Figure 24:
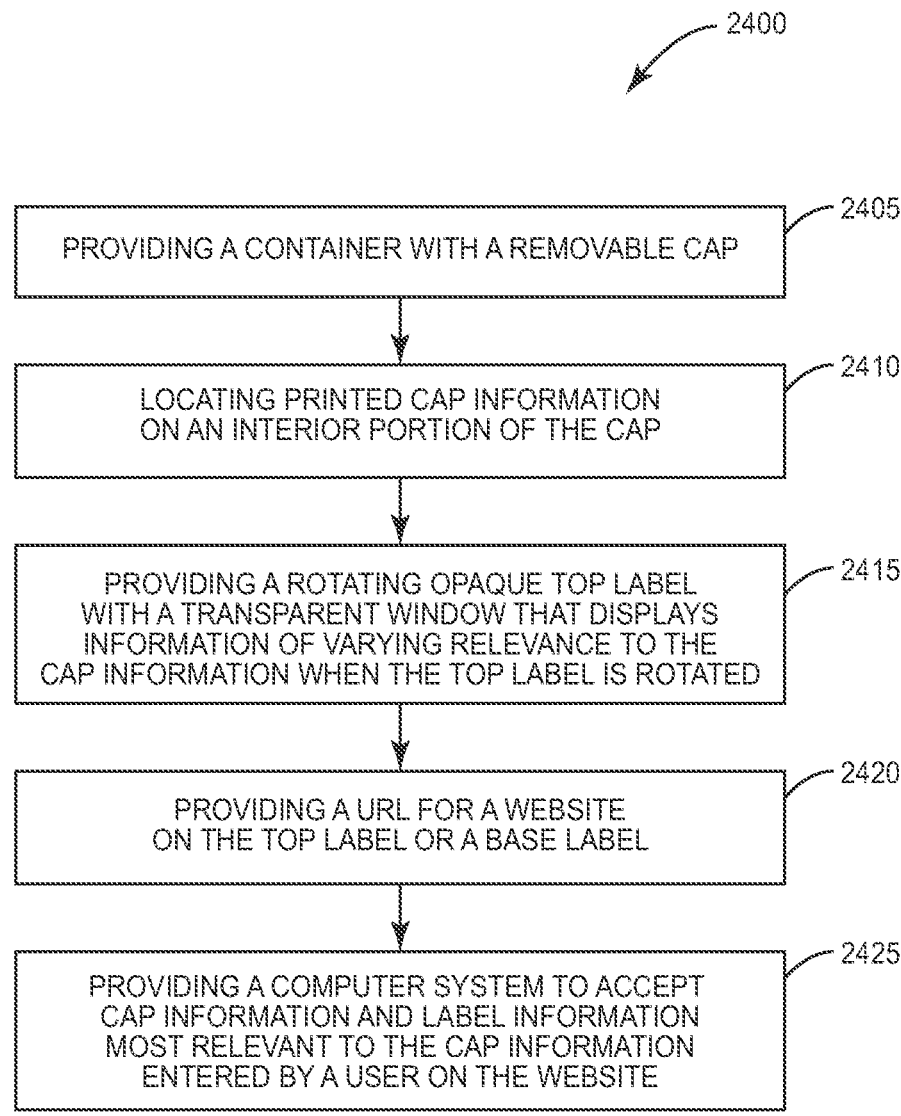
FIG. 24 is an exemplary flow diagram of a method for finding information of increasing relevance between a label and a closure on a container according to various embodiments.

FIG. 24 illustrates a general flow chart of various embodiments of an interactive and coordinated method 2400 for finding information of increasing relevance between a rotating label 300 and a closure 500 (such as a cap) on a container. At step 2405, a container 500 with a removable closure 502 may be provided. Printed closure information may be located on an interior portion 1610 of the closure 502 (step 2410). An opaque rotating top label 300 may be provided at step 2415, and the opaque rotating top label 300 may comprise a transparent window 1002. The transparent window 1002 may display label information 106 of varying relevance to the closure information when the opaque rotating top label 300 is rotated. A URL 2315 for a website may be provided on the opaque rotating top label 300 or a base label 100 (step 2420). The base label 100 may be coupled to the container 500 and positioned under the top label 300 such that at least a portion of the base label 100 is visible through the transparent window 1002. At step 2425, a computer system may be provided to accept closure information and label information 106 entered by a user, the label information 106 being the most relevant to the closure information.

In various embodiments of the method of FIG. 24, the opaque rotating top label may be rotated causing at least a second portion of the printed label information 106 to be displayed in the transparent window 1002. The user may determine which of the first and second portions of the printed label information 106 is most relevant to the printed closure information, and enter one or more of the first and second portions of the printed label information 106 and the printed closure information at the website.

Figure 25:
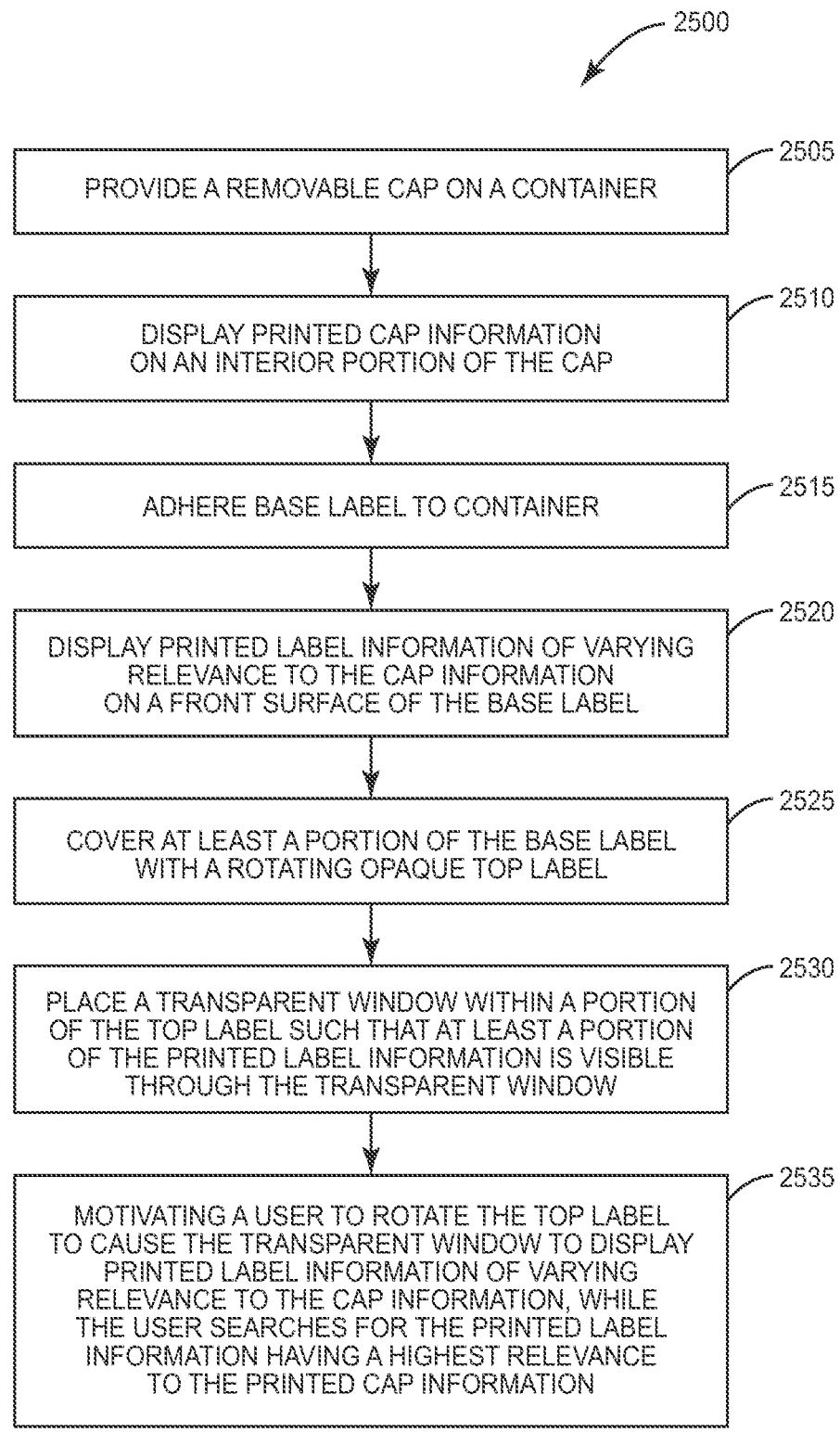
FIG. 25 is an exemplary flow diagram of a method for increasing user interaction with a container and a product brand according to various embodiments.

FIG. 25 illustrates a general flow chart of various embodiments of a method 2500 for increasing user interaction with a container and a product brand. At step 2505, a removable closure 502 (such as a cap) on a container 500 may be provided. Printed closure information may be displayed on an interior portion 1610 of the closure 502 (step 2510). At step 2515, a base label 100 may be adhered to the container 500. Printed label information 106 of varying relevance to the printed closure information may be displayed on a front surface of the base label 100 (step 2520). At least a portion of the base label 100 may be covered with an opaque rotating top label 300 (step 2525). A transparent window 1002 may be placed within a portion of the top label 300 such that at least a portion of the printed label information 106 is visible through the transparent window 1002 (step 2530). A user may be motivated to rotate the opaque rotating top label to cause the transparent window to display one or more portions of the printed label information 106, while the user searches for the portion of the printed label information 106 having a highest relevance to the printed closure information (step 2535).

A URL for a website may be provided on the opaque rotating top label 300 or a base label 100. The user may be motivated to enter the closure information and at least a portion of the printed label information 106 having the highest relevance to the closure information at the website to participate in a game or a contest.

In methods 2400 and 2500, the printed label information 106 may comprise a wide variety of alphanumeric codes, pictures, words, games, and contests as known in the art. In various embodiments, the printed label information 106 may be imprinted, embossed, or molded directly on an outer surface of the container 500 in place of all or a portion of the base label 100. The imprinting or embossing may be carried out using any printing or image transfer method known in the art. In various embodiments, the printing or image transfer method may be an offset process in which an image is transferred from a plate to an intermediate carrier, then to the outer surface of the container 500. The offset process may also involve lithographic techniques. Other printing or image transfer methods may comprise, for example, flexography, pad printing, relief printing, rotogravure, screen printing, and electrophotography. According to various embodiments, the printed label information 106 may be digitally printed on the outer surface of the container 500 using, for example, inkjet printing or laser printing. Chemical printing technologies, such as blueprint or diazo print may also be used in various embodiments.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An interactive rotating label and closure coordination system for a container to incentivize a user interaction with a website such that said interactive rotating label and closure coordination system provides information for use with a contest on said website and said interactive rotating label and closure coordination system comprising:
   a removable closure of said container having first printed label information printed thereon; and a rotating label comprising:
   a base label having base label printed label information printed thereon, which is affixed to the container; and a rotating label configured to rotate about the base label and said rotating label having a rotating label transparent window that allows a portion of the base label printed label information to be visible through the transparent window, wherein the base label printed label information is related to the printed label information such that the combination of the rotating label and base label printed label information provides an additional information when the base label printed label information is visible through said rotating label transparent window and said additional information is an alphanumeric code and said alphanumeric code is selected from the group consisting of an indication of whether said contest is won, a plurality of chances to win the contest, forms a completed word when read with said rotating label printed label information and said additional information is not available from the first printed label information and base label printed label information separately; and
   said additional information provides an incentive to a user to visit said website, whereupon said user enters said additional information and said website determines if said additional information has won said contest.

2. The interactive rotating label and closure coordination system of claim 1, wherein said base label printed label information includes machine readable information that automatically causes a user to visit a website when the machine readable information is read by an electronic device.

3. The interactive rotating label and closure coordination system of claim 2, wherein said machine readable information causes the application to open a browser, and the machine readable information includes a URL that causes the browser to display the website corresponding to the URL on the electronic device.

* * * * *